United States Patent
McCombs et al.

(10) Patent No.: US 8,949,110 B2
(45) Date of Patent: Feb. 3, 2015

(54) SYSTEM AND METHOD FOR EXTRACTING CATEGORIES OF DATA

(75) Inventors: Peter McCombs, Orem, UT (US);
Spencer Koehler, Sandy, UT (US);
Laryn Brown, Highland, UT (US)

(73) Assignee: Ancestry.com Operations Inc., Provo, UT (US)

( * ) Notice: Subject to any disclaimer, the term of this patent is extended or adjusted under 35 U.S.C. 154(b) by 740 days.

(21) Appl. No.: 13/242,566

(22) Filed: Sep. 23, 2011

(65) Prior Publication Data
US 2013/0080149 A1 Mar. 28, 2013

(51) Int. Cl.
*G06F 17/27* (2006.01)

(52) U.S. Cl.
CPC .................................. *G06F 17/278* (2013.01)
USPC ............................................................ 704/9

(58) Field of Classification Search
CPC ................................................... G06F 17/278
USPC ............................................................ 704/9
See application file for complete search history.

(56) References Cited

U.S. PATENT DOCUMENTS

| | | | |
|---|---|---|---|
| 4,741,045 A | 4/1988 | Denning | |
| 6,052,480 A | 4/2000 | Yabuki et al. | |
| 7,043,690 B1 * | 5/2006 | Bates et al. | 715/234 |
| 2001/0018739 A1 * | 8/2001 | Anderson et al. | 713/176 |
| 2003/0229634 A1 * | 12/2003 | Li | 707/4 |
| 2006/0059162 A1 * | 3/2006 | Rizk et al. | 707/10 |
| 2009/0319521 A1 * | 12/2009 | Groeneveld et al. | 707/6 |
| 2011/0113047 A1 * | 5/2011 | Guardalben | 707/754 |
| 2012/0045150 A1 * | 2/2012 | Brummer et al. | 382/321 |
| 2013/0077863 A1 | 3/2013 | McCombs et al. | |
| 2013/0080149 A1 | 3/2013 | McCombs et al. | |

* cited by examiner

*Primary Examiner* — Jialong He
(74) *Attorney, Agent, or Firm* — Kilpatrick Townsend & Stockton LLP

(57) ABSTRACT

Lines of data that are from a historical document, such as a digitized city directory, have information extracted and stored in searchable data fields. Words and phrases within the lines of data are identified and tagged. Rendering rules are applied to the tagged words and phrases to extract names, addresses, occupations, spouse information and other data, and store that data in the searchable fields.

14 Claims, 41 Drawing Sheets

112 — 100

SPERRY'S STOCKTON FLOUR — LEADS THEM ALL.

| 494 | LOS ANGELES [ O ] DIRECTORY. |

110 — 120

*(Left margin, vertical text: WILLIAM J. DINGEE, Real Estate, 460 AND 462 EIGHTH ST., OAKLAND, CAL.)*

O'Brien William, res 943 Aliso
O'Brien William (Rowan & O'Brien) res 106 North Main
O'Bryan Charles, plasterer, res 556 Wall
O'Bryan John F., tuckpointer, res 117 West Fifteenth
O'Bryan John L., real estate, 112 South Spring, res 2529 East First
O'Connell Timothy, teamster, res Vigo House
O'Connor Christopher, horseshoer G. L. Grimston, res 239½ South Main
O'Connor Daniel, harness cleaner Ausin & Reichard, res 373 North
130 — Main
O'Connor Daniel J., painter, res 2600 New York Av
O'Connor Dennis, tracklayer S. P. Co., res 209 Sotello
O'Connor John, farmer, res Somerset House
O'Connor John J., detective McCarthy's Detective Agency, res 316 East
132 — First
O'Connor John J. Jr., bricklayer, res 914 East Sixth
O'Connor Joseph, shoemaker F. Mathews, res 416 North Main
O'Connor Mollie A. Miss, teacher Spring-street School, res 138 North
134 — Bunker Hill Ave.
O'Connor Patrick, gripman Pac. Ry., res 727½ South Grand Av
O'Dea Bridget, widow, res 450 East Fifteenth
O'Dea Michael F. (Burbank, Baker & O'Dea) res 450 East Fifteenth
O'Donnell A. Mrs., lodgings 111½ South Broadway
O'Donnell Charles, horse clipper, 114 East First
O'Donnell Charles, laborer, res 355 North Broadway
O'Donnell George H., molder L. A. Pioneer Iron Foundry, res 459 Commercial
O'Donnell James F., optician and second-hand books, 405½ South Spring
O'Donnell James W., machinist L. A. Pioneer Iron Foundry, res 459 Com-
132 — mercial
O'Donnell John, res Grand Central Hotel
O'Donnell John, laborer, res San Fernando and Sotello
O'Donnell Patrick N., proprietor L. A. Pioneer Iron Foundry, res Manhattan Station
O'Donnell Thomas, laborer, res 130½ North Los Angeles
O'Donnell William C., news agent S. P. Co., res 111½ South Broadway
O'Donoughue Jennie Miss, copyist Abstract and Title Insurance Co., res 626 West
     Fifteenth
O'Donoughue Julia A., widow, res 626 West Fifteenth
O'Donoughue Maggie Miss, teacher Thirtieth-street School, res 626 West Fifteenth
O'Gara Edward (Lovie, Dodd & Co.) res 113 North Bunker Hill Av
O'Gorman Ella F. Mrs., teacher Garey-street School, res 229 North Broadway
O'Gorman Michael M., manager L. A. Granite and Brown Stone Co., 175 North Spring,
     res 229 North Broadway
O'Hanlon John R., barkeeper, res 1036 Temple
O'Hara Edward, farmer, res Chavez Tract 114
110

C. L. DINGLEY & CO., LUMBER CARGOES, 29 STEUART ST. SAN FRANCISCO

O'Brien William, res 943 Aliso
O'Brien William, (Rowan & O'Brien) res 106 North Main
O'Bryan Charles, plasterer, res 556 Wall
O'Bryan John F., tuckpointer, res 117 West Fifteenth
O'Bryan John L., real estate, 112 South Spring, res 2599 East First
O'Connell Timothy, teamster, res Vigo House
O'Connor Christopher, horseshoer G.L. Grimston, res 239½ South Main
O'Connor Daniel, harness cleaner Austin & Reichard, res 373 North Main
O'Connor Daniel J., painter, res 2600 New York Av
O'Connor Dennis, tracklayer S.P. Co., res 209 Sotello
O'Connor John, farmer, res Somerset House
O'Connor John J., detective McCarthy's Detective Agency, res 316 East First
⋮

FIG. 2

Given Name:William
Surname:O'Brien
Residence location: 943 Aliso, Los Angeles, Los Angeles, California, USA
Residence Year:1891

Given Name:William
Surname:O'Brien
Residence location: 106 North Main, Los Angeles, Los Angeles, California, USA
Residence Year:1891

Given Name:Charles
Surname:O'Bryan
Residence location: 556 Wall, Los Angeles, Los Angeles, California, USA
Residence Year:1891
Occupation:plasterer Given Name:John F
Surname:O'Bryan
Residence location: 117 West Fifteenth, Los Angeles, Los Angeles, California, USA
Residence Year:1891
Occupation:tuckpointer Given Name:John L
Surname:O'Bryan
Residence location: 2529 East First, Los Angeles, Los Angeles, California, USA
Residence Year:1891
Occupation:real estate Given Name:Timothy
Surname:O'Connell
Residence location: Vigo House, Los Angeles, Los Angeles, California, USA
Residence Year:1891
Occupation:teamster Given Name:Christopher
Surname:O'Connor
Residence location: 239i South Mau, Los Angeles, Los Angeles, California, USA
Residence Year:1891
Occupation:horseshoer

FIG.5

NUMBER

Number
⇓

O'Connor Daniel J., painter, res 2600 New York Av

Number
⇓

O'Hara Matthew, well borer, res 8 Turner

Number
⇓

Hund F J, Leavenworth 4

Number
⇓

Bastian John B, jr, manager, h 109 2d av

FIG.10

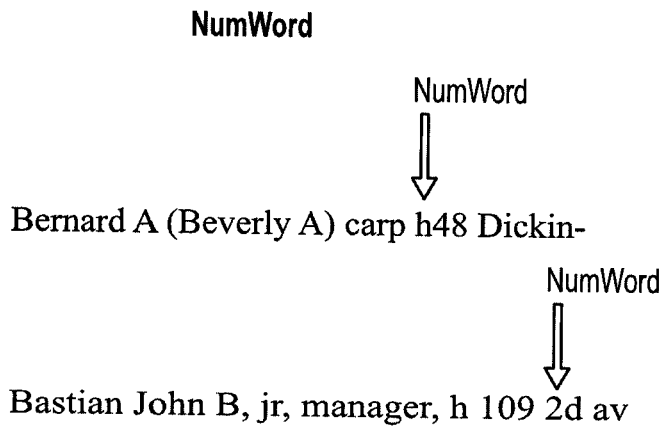
FIG.12
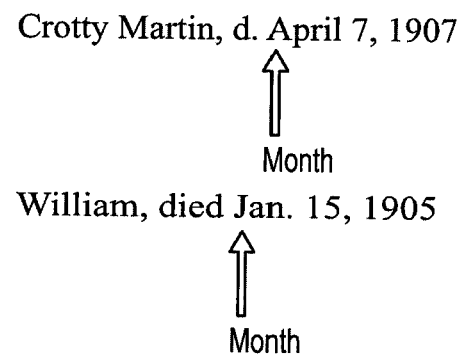
FIG.13
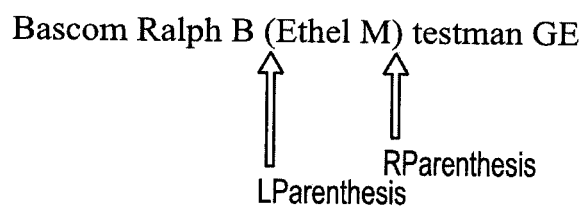
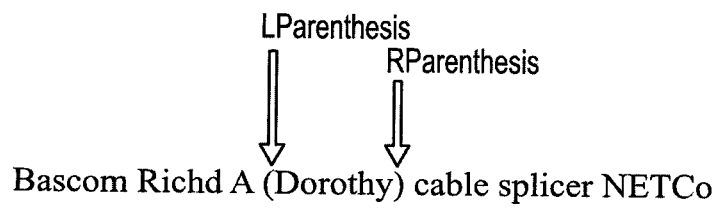
FIG.14

DATE

Date
⏞
Crotty Martin, d. April 7, 1907

Date
⏞
William, died Jan. 15, 1905

FIG. 17

WIDOW

O'Dea Bridget, widow, res 450 East Fifteenth
⇧
Widow
Bentley Mary A, widow John S, h Harmony nr 3d av
⇧
Widow
Bass Lena wid Philiip h136 Bradford
⇧
Widow

FIG. 18

MOCCUPATION

Bartow John III USN r 638 East
⇧
Moccupation
Bartow Edw P USA r1250 East
⇧
Moccupation

FIG. 19

RESTYPE
Bartow John III USN r638 East
Restype (NumWord)
Minnie Mrs h30 Dexter av
Restype (NumWord)
O'Bryan Charles, plasterer, res 556 Wall
Restype
Baldwin William M, manager, h 505 Main
Restype
Eaton Greenwood P r Main..............................126
Restype
FIG.21

MovedPhrase

MovedPhrase
⏞
Cullinan William J. rem. to Somerville

FIG.22

DiedPhrase

DiedPhrase
⏞
Crotty Martin, d. April 7, 1907

DiedPhrase
⏞
William, died Jan. 15 1905

FIG.23

WidowPhrase

WidowPhrase

Bentley Mary A, widow John S, h Harmony nr 3d av

WidowPhrase

Bass Lena wid Philip h136 Bradford

No Phrase

O'Dea Bridget, widow, res 450 East Fifteenth

WidowPhrase

Blevins Frances M (wid Jas P) tchr Harrison School r212 Walton av

WidowPhrase

Fenders Catharine, widow of Henry, house 12 Water

FIG.24

SURNAME RENDERING

| PNamePhrase | Extracted Surname |
|---|---|
| O'Brien William | s="O'Brien" |
| Cullinan William J. | s="Cullinan" |
| Crotty Martin, | s="Crotty" |
| O'Connor Daniel, | s="O'Connor" |
| Barstler William L. | s="Barstler" |
| De La Hoya Martin | s="De La Hoya" |
| Aarons, Wm | s="Aarons" |

FIG.39

GIVEN NAME RENDERING

| PNamePhrase | Extracted Given Name |
|---|---|
| O'Brien William | g="William" |
| Cullinan William J. | g="William J" |
| Crotty Martin, | g="Martin" |
| O'Connor Daniel, | g="Daniel" |
| Barstler William L. | g="William L" |
| De La Hoya Martin | g="Martin" |
| Aarons, Wm | g="Wm' |

FIG.40

PREFIX RENDERING

Prefix
O'Connor Mollie A. Miss,    t="prefix" v="Miss"
                           g="f"

Prefix
O'Gorman Ella F. Miss.,    t="prefix" v="Mrs"
                           g="f"

FIG.41

SUFFIX RENDERING

Suffix
O'Connor John J. Jr.,

Suffix
Bastian John B, jr,

Suffix
Bartow John III

FIG.42

SpouseNamePhrase RENDERING

Surname (Primary)   SpouseNamePhrase
Bascom Ralph B (Ethel M)

```
<person id="3:4:1:2">
<name g="Ralph B" s="Bascom" />
<gender g="m" />
<marriage m="3:4:1:2" f="4:4:1:2" />

<person id="4:4:1:2">
<name g="Ethel M" s="Bascom" />
<gender g="f" />
<marriage m="3:4:1:2" f="4:4:1:2" />

<family m="3:4:1:2" f="4:4:1:2" />
```

Surname (Primary)   SpouseNamePhrase
Bascom Violet A (Mrs Lawrence S)

```
<person id="3:4:1:2">
<name sp="1:3:560-550-700-584,400-551-544-589" g="Violet A" s="Smith" />
<gender g="f" />
<marriage m="4:4:1:2" f=3:4:1:2" />

<person id="4:4:1:2">
<name sp="1:3:560-550-700-584,400-551-544-589" g="Lawrence S" s="Smith" />
<gender g="m" />
<marriage m="4:4:1:2" f=3:4:1:2" />

<family m="4:4:1:2" f=3:4:1:2" />
```

FIG.43

AddressPhrase RENDERING

$\overbrace{\text{res 117 West Fifteenth}}^{\text{AddressPhrase}}$ = Residence Address: 117 West Fifteenth $\overbrace{\text{h Chestnut bel 3d av}}^{\text{AddressPhrase}}$ = Residence Address: Chestnut bel 3d av $\overbrace{\text{res 373 North}}^{\text{AddressPhrase}}$ = Residence Address: 373 North $\overbrace{\text{r273 Merrill rd}}^{\text{AddressPhrase}}$ = Residence Address: 273 Merrill rd

FIG.44

Spouse Address RENDERING

Bragg Lester P (Vivian E) driver $\overbrace{\text{h793 Elkington av}}^{\text{AddressPhrase}}$

FIG.45

OccPhrase RENDERING

O'Bryan Charles, plasterer v="plasterer"

Branson Henry J, receiving teller v="receiving teller"

Bernard A (Beverly A) carp v="carp"

Bartsch Evelyn I Mrs emp v="emp"

FIG.46

MOCCUPATION RENDERING

Moccupation
⌢
Bartow John III USN v="United States Navy"

Moccupation
⌢
Edw P USA v="United States Army"

FIG.47

MovedPhrase RENDERING

MovedPhrase
⌢
Cullinan William J. rem. to Somerville p="Somerville" nd="1891"

FIG.48

DiedPhrase RENDERING

DiedPhrase
⌢
d. April 7, 1907

DiedPhrase
⌢
d. Jan. 15, 1905

FIG.49

WidowPhrase RENDERING

```
<person id="3:4:1:2">
<g="Mary A" s="Bentley" />
<gender g="f" />
<marriage m="4:4:1:2" f=3:4:1:2" />

<person id="4:4:1:2">
<g="John S" s="Bentley" />
<gender g="m" />
<marriage m="4:4:1:2" f=3:4:1:2" />

<family m="4:4:1:2" f=3:4:1:2" />
```

WidowPhrase
{
Bentley Mary A., widow John S
}

FIG.50

WIDOW RENDERING

```
<person id="3:4:1:2">
<name sp="1:3:560-550-700-584,400-551-544-589" g="Bridget" s="O'Dea" />
<gender g="f" />
```

No Phrase

O'Dea Bridget, widow

FIG.51

SYSTEM AND METHOD FOR EXTRACTING CATEGORIES OF DATA

CROSS REFERENCE TO RELATED APPLICATIONS

This application is related to U.S. application Ser. No. 13/242,736, "System and Method for Capturing Relevant Information from a Printed Document," filed on even date herewith, the complete disclosure of which is hereby incorporated by reference.

BACKGROUND OF THE INVENTION

With ever expanding use of the Internet, digital content services are becoming increasingly popular. Companies digitize books, official records, and other printed documents, and make them available to subscribing customers. Digitized records are often easier than traditional physical documents to review, search and analyze for various purposes, such as research. Thus, it has become desirable to digitize many historical records to facilitate research.

The most efficient method of digitizing printed records is to electronically scan them and use optical character recognition (OCR) to convert the scanned text to computer readable text. However, historical records are often difficult to use when scanned because of unique formatting of the original document, and also because of graphics and other material not relevant to the likely purpose of use/research of the digitized document. Often some judgment needs to be exercised as to how formatting should be accommodated and as to what data is relevant, leading to a person having to manually review each record page (either before or after using OCR), or alternatively, manually entering data from the record at a keyboard (rather than using OCR).

One example of the difficulties in digitizing records are illustrated by historical "city directories." These directories were published by many different publishers across the United States from the late 1800's to the mid-1900's, and include listings by name of every resident (or nearly every resident/head of household) in a given city. Such directories thus provide a historical snapshot of people and their respective addresses in that city at the time of publication and thus, collectively, are a valuable tool for tracking people across the United States during time periods covered by those city directories. However, city directories often include other, less useful information (unrelated to the names of residents) that make it difficult to use standard OCR methodologies to efficiently capture and use information. If a city directly is simply digitized (using OCR methodologies), the useful information (e.g., names) may be intermingled with less useful information and the format of data in the digitized directory may make the resulting data difficult to access and search by a user.

To illustrate the foregoing, reference is made to FIG. 1, which illustrates one page from a city directory for Los Angeles, Calif., published in 1891. As seen, the directory page 100 includes a listing 110 of names (ordered alphabetically by last name), each name appearing on a line, with some lines wrapping or continuing to the next line (without a person's name appearing on the wrapping line). The listing 110 includes information associated with each name, such as occupation and address (which associated information may also be useful to a researcher attempting to locate individuals by name).

The page 100 also includes information that would normally not be useful to a researcher or user (i.e., a user looking for individuals by name), such as advertising text 112 at the top of the page, adverting text 114 along the side, advertising text 116 at the bottom of the page and a header portion 120 with page number and directory identification. While not shown in FIG. 1, a typical city directory might include other information that would also not be useful, such as indexes, listings ordered by street or address (rather than names), pictorial or graphical advertising, and informational text concerning the city.

As discussed above, for purposes of digitizing the information on the directory page 100, it would be desirable to exclude the information that would not be useful to a user or researcher.

In addition, it would be useful (for purposes of access and retrieval) to have information on each person in the directory arranged as a single line or entry of computer readable text, ordered alphabetically by the last name of a person, and with each such line having any other useful information associated with the person. For example, as seen in FIG. 1, certain lines are indented (such as those designated by example as 130, 132 and 134), and thus are each a continuation or wrapping line of an immediately preceding line. It would be desirable for any such wrapping line to be combined or merged with its preceding line into a single line or entry of computer readable text.

Aforementioned U.S. application Ser. No. 13/242,736, discloses the processing of scanned data from a printed directory, with irrelevant information removed and with wrapping lines (and lines with dittoed last names) reconstructed so that the resulting file or digitized document has a listing for each person in the directory as a single line or entry of computer readable text and has last names appropriately inserted (e.g., when missing due to dittos). For example, referring to FIG. 2, there are illustrated listings from the same page of the directory that is seen in FIG. 1, but with the scanned data now arranged so that the data for each person appears in a single line, using the systems and methods described in U.S. application Ser. No. 13/242,736.

While such an arrangement makes the digitized document easier to use, it would be desirable to extract certain data from the lines and put them into searchable data fields to make that data more easily searched and accessed, for example by the use of standard database queries.

With such extraction, the data from many thousands of city directories could be combined, e.g., into a single database, so that a user trying to locate or track a person could enter one or more search terms and retrieve information, such as name, address and other information associated with the person found in any of the directories. However, because the listings are taken from many directories with many different formats (and different ordering of information on each line), the ability to extract certain information (for example, a name or an address) is difficult to do without human review and analysis.

BRIEF SUMMARY OF THE INVENTION

The present invention provides systems and methods for extracting information from lines of computer readable text or data.

In one embodiment, a method is provided for the extracting information from a line of computer readable data and creating a searchable data field in which the extracted information is stored. The line of data includes words representing a name of a person and words representing other information related to the person.

The method includes: (a) starting at one end (or a beginning point) of the line of data and moving from left to right (in relation to the lines seen in FIG. 2), sequentially capturing each word beginning with a capital letter, until a name delimiter is reached, (b) designating the sequentially captured words as the name of the person, (c) storing the designated name in a searchable data field, and (c) associating other information from the line of computer readable data with the designated name.

In one described embodiment, the line of computer readable data has been obtained from a historical document, such as a city directory. Information extracted from the line of data includes a name, an address, an occupation, and/or other information relating to a person listed in the city directory.

BRIEF DESCRIPTION OF THE DRAWINGS

FIG. 1 illustrates one page of a city directory, from which it would be desirable to capture and digitize information.

FIG. 2 illustrates listings from the city directory page seen in FIG. 1, but with irrelevant information removed and lines reconstructed such that each listing is a single line of computer readable text or data.

FIG. 5 is an illustration of exemplary data records resulting from the process of FIG. 4.

FIGS. 9-21 illustrate examples of various types of words identified or tagged in lines of data taken from a city directory, as part of extracting information from the lines of data.

FIGS. 22-29 illustrate examples of various types of phrases identified or tagged in lines of data taken from a city directory, as part of extracting information from the lines of data.

FIG. 39 is an example of surname rendering in a line of data.

FIG. 40 is an example of given name rendering in a line of data.

FIG. 41 is an example of prefix rendering in a line of data.

FIG. 42 is an example of suffix rendering in a line of data.

FIG. 43 is an example of spouse name phrase rendering in a line of data.

FIG. 44 is an example of address phrase rendering in a line of data.

FIG. 45 is an example of spouse address rendering in a line of data.

FIG. 46 is an example of occupation rendering in a line of data.

FIG. 47 is an example of military occupation rendering in a line of data.

FIG. 48 is an example of moved phrase rendering in a line of data.

FIG. 49 is an example of died phrase rendering in a line of data.

FIG. 50 is an example of widow phrase rendering in a line of data.

FIG. 51 is an example of widow rendering in a line of data.

DETAILED DESCRIPTION OF THE INVENTION

Embodiments of the invention provide for the extraction of digitized information from a printed document, such as a historical record, to facilitate access and use of the information.

In one embodiment, lines or entries of data, each having computer readable text associated with a person (such as name, address, and/or occupation), have certain data extracted. In one embodiment, the extracted data is the name of the person. The extracted name may be stored (and may also be associated with other data in that same line of data), to facilitate searching of and access to the data. In other embodiments, the extracted data may be addresses, occupations, or other information in the original document.

In some embodiments, a printed document (such as a historical document or record) is digitized. The document is scanned and image data is provide to an optical character recognition (OCR) system. Zones of text are removed (based on predetermined characteristics), and individual lines are classified, with some lines are removed and reconstructed based on the classification, so that there is a single line of data corresponding to each record entry (e.g., an entry for one person). Certain data or information is extracted from the individual lines of data so that the data can be more readily searched and accessed.

In one described embodiment, the printed document is a city directory that has been digitized into computer readable text. Lines of data (each corresponding to a person listed in the directory) have name, address and occupation data extracted and stored in order to facilitate searching of the digitized directory. Other data may be extracted based on the analysis of each line of data, such as gender, marital status, family relationships, and deaths.

While the described embodiment is directed to a city directory (as described earlier in conjunction with FIG. 1), it should be appreciated that the features of the invention can be used in connection with many other types of printed documents, including both historical records (such as voter registration lists, military muster rolls, and vital statistics records), and non-historical records.

Figure 3:
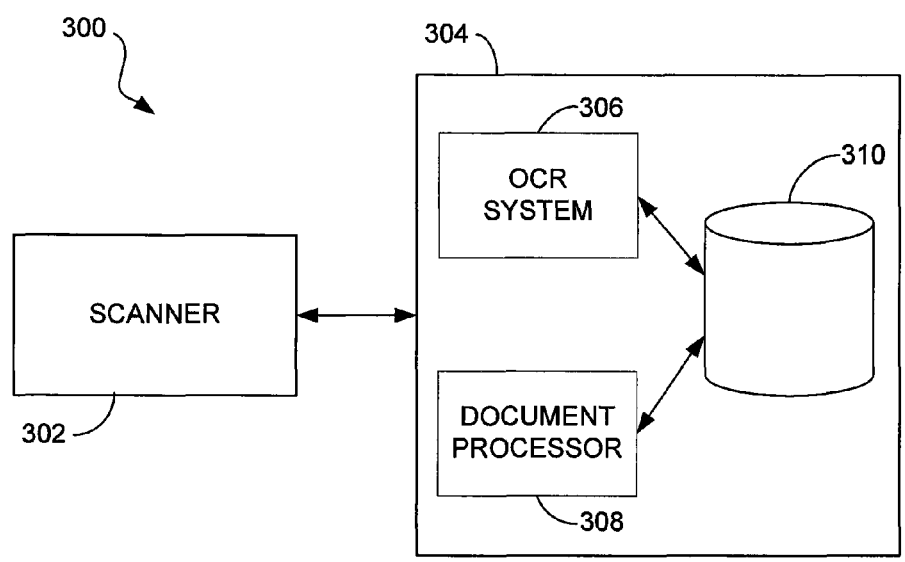
FIG. 3 is a simplified block diagram of a document digitizing and processing system, illustrating one embodiment of the invention.

Turning briefly to FIG. 3, there is illustrated a simplified block diagram of a system 300 for carrying out aspects of the present invention. The system 300 includes a scanner 302 for scanning each page of a printed document, such as a city directory. The scanner 302 is conventional, and pages of the directory may be scanned individually, or automatically (such as by removing the spine of the directory and having the resulting stacked pages automatically fed and scanned at the scanner 302). The system 300 further includes a document processing system 304 that includes an optical character recognition (OCR) system 306 for converting the scanned and digitized images received from the scanner 302 into computer readable text, and a document processor 308 that is programmed for processing the computer readable text from OCR system 306 in accordance with aspects of the invention. Data representing information from the directory (and as it may exist during or after various stages of processing) is stored in a memory system 310.

Figure 4:
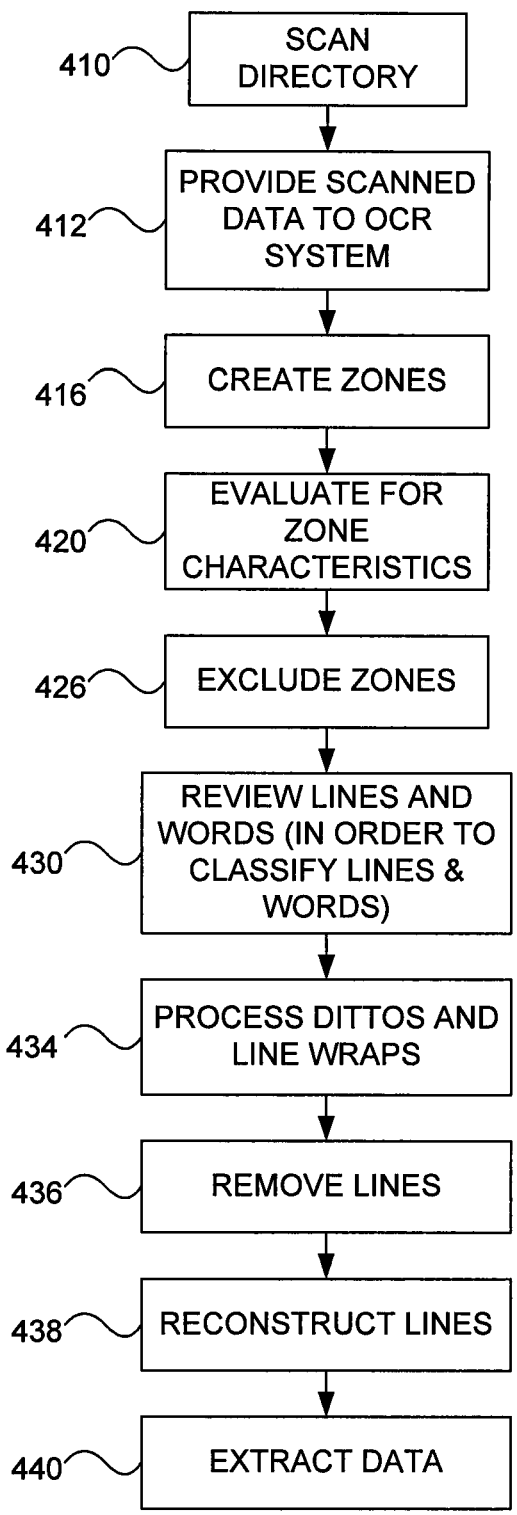
FIG. 4 is a flow diagram illustrating a process for digitizing and extracting data from a city directory according to various embodiments of the invention.

Turning now to FIG. 4, there is shown a general flow diagram of a process for digitizing a city directory. At step 410, the pages of the directory are optically scanned (using scanner 302), and at step 412 the optically scanned data (in the form of images) is provided to the OCR system 306 within processing system 304 for converting the images to computer readable text.

At step 416, zones of text are then defined or created by the OCR system for each page of the directory, and at step 420 each zone is then evaluated by system 304 for characteristics that indicate the zone as having data that is likely to be irrelevant. At step 426 zones with irrelevant data are excluded or removed from the digitized directory. Briefly, creating text zones at step 416 can be based on analyzing blank and extraneous characters, white space around blocks of text (e.g., in relation to space between lines), separation borders or rulings, changes in font and alignment of characters, and other well known analysis. Six different zone characteristics are evaluated at step 420: (1) zone size characteristics, (2) zone format characteristics, (3) lower case characteristics, (4) index characteristics, (5) paragraph characteristics, and (6) address/number first characteristics. Each zone having certain specified zone size characteristics, zone format characteristics, lower case characteristics, index characteristics, paragraph characteristics, and address/number first characteristics, are then excluded or removed from the digitized directory at step 426. Further details on how zones are created, how zones characteristics are determined and evaluated, and how zones are removed can be found in the aforementioned U.S. application Ser. No. 13/242,736.

At step 430, the lines of each remaining zone are reviewed for certain characteristics for the purpose of classifying the lines and certain words within the lines, and at step 430 the system processes dittos and processes line wraps (any line that is a continuation of a preceding line). At step 436, certain lines (not having useful information) are removed from the digitized document and at step 438 the remaining lines are reconstructed as appropriate, including appending any wrapped line to the prior line with which it is associated. Further details on how lines are reviewed, how dittos and line wraps are processed, and how lines are removed and reconstructed can likewise be found in the aforementioned U.S. application Ser. No. 13/242,736. The data resulting from steps 410-438 are lines of data records or entries, each line corresponding to a person listed in the directory and having a name (and other useful information associated with that person). Examples of such lines of data are seen in previously referenced FIG. 2.

Finally, at step 440, certain data is extracted from the lines of data (such as those illustrated in FIG. 2), in order to facilitate the access and use of that data. The manner of extracting various data in accordance with some embodiments will be described below in conjunction with FIGS. 6-8. In one embodiment, names are extracted and then stored in memory system 310 (along with other information associated with that name), thus permitting a user to search by name (and retrieve matching names and other data associated with the matched names). In other embodiments, other information (such as addresses and/or occupations) can be separately extracted, stored and also searched.

FIG. 5 is an illustration of one example of data records resulting from the extraction (step 440) of names, addresses and occupations from lines of data. As seen, for each person in the directory, a searchable data record is created with fields corresponding to that person's name ("Given Name" and "Surname"), address ("Residence Location") and occupation ("Occupation"), if available. The data records illustrated in FIG. 5 correspond to the first seven people listed on the directory page 100 seen in FIG. 1 (and also correspond to the first seven lines of data seen in FIG. 2). As will be described in greater detail later, the address can be augmented with known data for the city of the published directory (as illustrated in FIG. 5, "Los Angeles, Calif., USA"), and a date field ("Residence Year") can be created from the known year of publication of the directory. As mentioned earlier, other information (not seen in FIG. 5) from the directory can also be extracted from the lines of data and stored in memory system 310 in association with the data records illustrated in FIG. 5.

Figure 6:
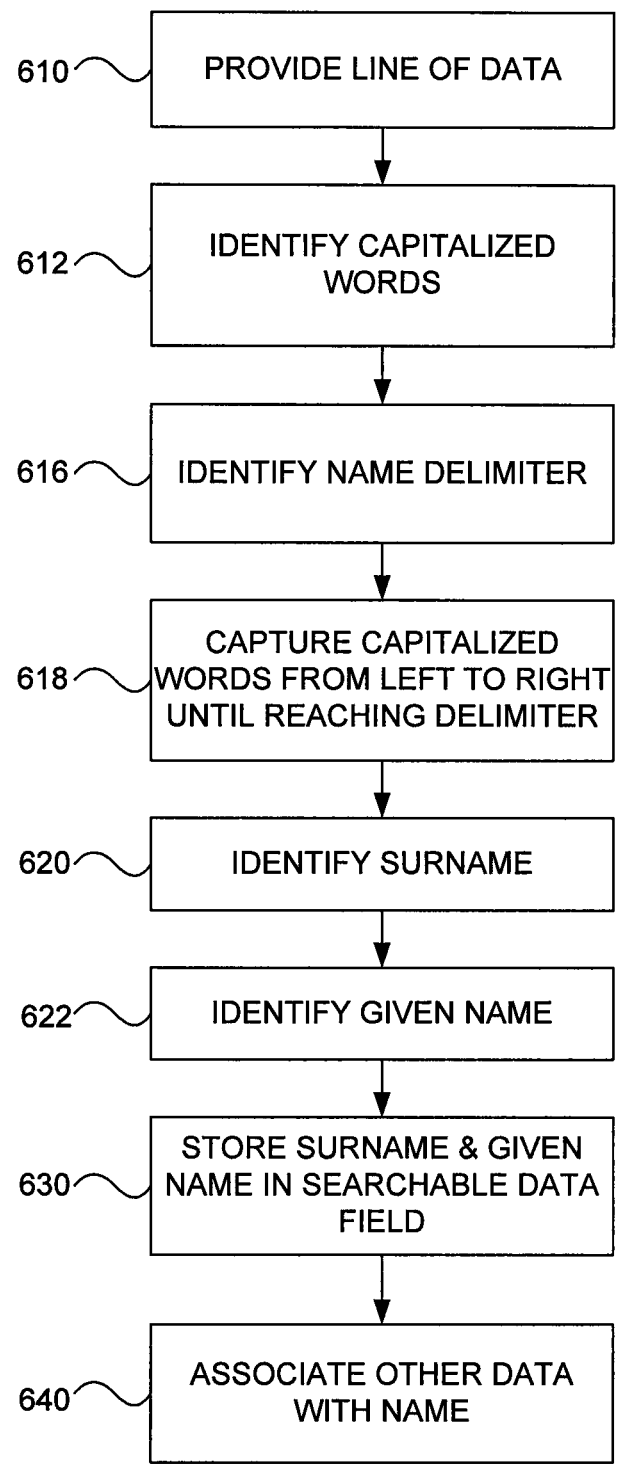
FIG. 6 is a flow diagram illustrating a method for extracting a name from a line of data taken from a city directory.
Figure 7:
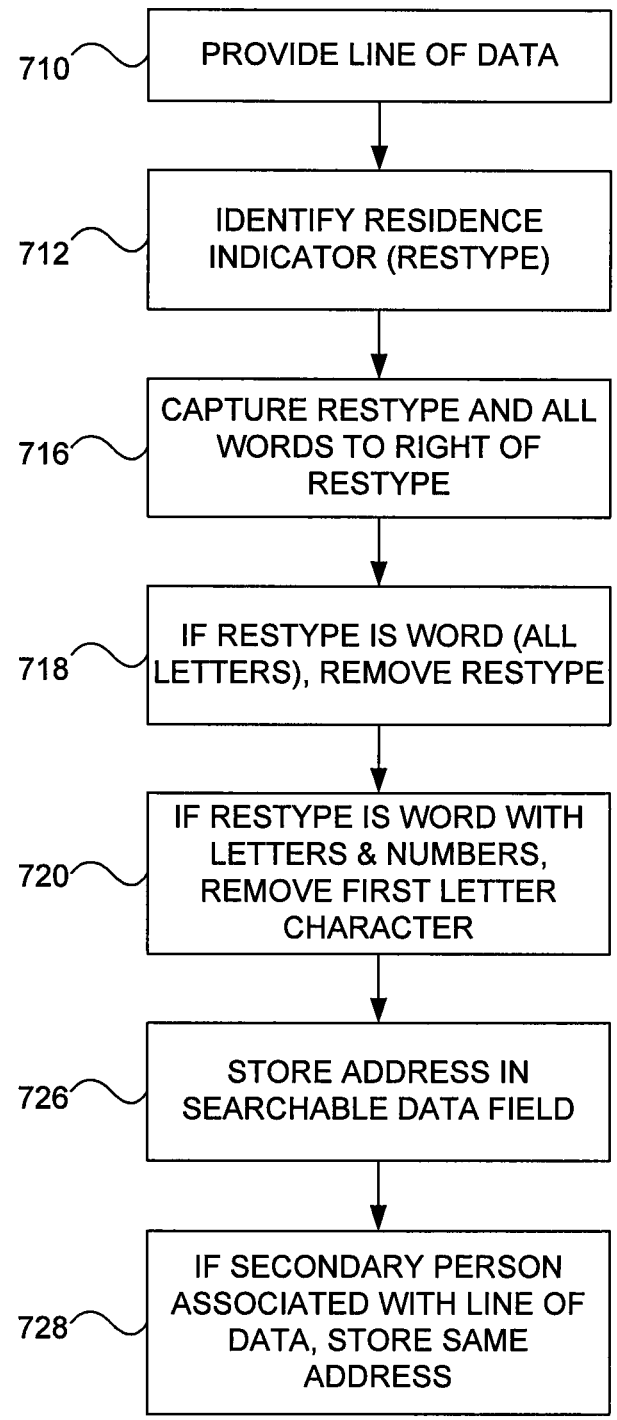
FIG. 7 is a flow diagram illustrating a method for extracting an address from a line of data taken from a city directory.
Figure 8:
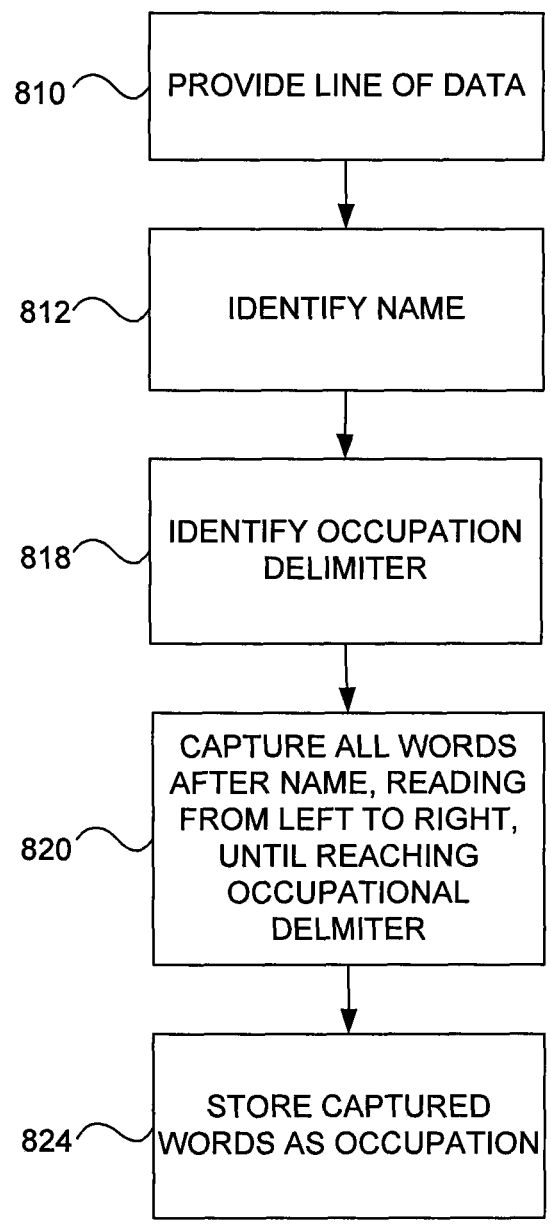
FIG. 8 is a flow diagram illustrating a method for extracting an occupation from a line of data taken from a city directory.

FIGS. 6, 7 and 8 illustrate several processes for extracting data (collectively represented by step 440, FIG. 4) in accordance with some embodiments of the invention, with such processes carried out under the control of the document processor 308 within the system 304 (FIG. 3). There are three illustrated embodiments in these processes. In one illustrated embodiment (FIG. 6), a name is extracted and stored in a data field associated with a person. In another illustrated embodiment (FIG. 7), an address is extracted and stored in a data field associated with a person. In a third illustrated embodiment (FIG. 8), an occupation is extracted and stored in a data field associated with a person. While shown as three separate embodiments and processes, it should be appreciated that in some instances all three processes could be used in one overall embodiment, with all three types of data (name, address, occupation) being extracted (where possible) and stored in data fields associated with a person. Furthermore, it should also be appreciated that in further embodiments (to be described later), many other types of data (beyond name, address and occupation) may be extracted from each line of data and stored in data fields associated with a person.

Turning to FIG. 6, there is illustrated a simplified flow diagram of an exemplary process for extracting a name from a line of data, such as one of the lines of data from a city directory that are seen in FIG. 2. The line of data (from which a name is to be extracted) is provided to the system at step 610. At step 612, the system indentifies capitalized words (e.g., first letter capitalized) in the line of data and then at step 616 identifies any name delimiter that appears in the line. A more complete explanation of both identifying capitalized words and indentifying delimiters will be given later in connection with FIGS. 11, 20, 28, 39 and 40. Briefly, a delimiter is a word, character, or symbol that has been predetermined (e.g., based on experience) as likely to identify the end or boundary of a person's name (in this case, likely for a city directory). Examples of delimiters will be provided later.

Next, the system sequentially captures each capitalized word, starting at one end of the line and moving from left to right (in relation to one of the lines of data seen in FIG. 2), until reaching the delimiter. At steps 620 and 622, a surname and a given name are identified from the captured words. Again, a more specific and detailed explanation will be given later, but in general, the surname and given name are based on the word location within the string of words sequentially captured at step 618. At step 630, the surname and given name are stored in searchable data fields (such as the illustrated data fields in FIG. 5). Finally, at step 640, other data from the same line may be stored in association with the name (surname and given name), in order to make the other information accessible when the name is retrieved or accessed. As an example of how the association of data at step 640 might be later used, if the system extracts names and stores them in searchable fields, a user of the system attempting to locate a person by name would also be able to retrieve at the same time any data stored in association with a located name (such additional data providing additional useful information on the person identified by the name).

FIG. 7 is a simplified flow diagram of an exemplary process for extracting an address, such as from one of the lines of data that are seen in FIG. 2. The line of data (from which an address is to be extracted) is provided to the system at step 710. At step 716, the system identifies any residence indicator (Restype) in the data. Residence indicators are words or characters known to be used in a city directory (or other document from which the line of data originated) to indicate an address, such as the letters "h" or "res." A more complete set of examples of residence indicators for different publications will be given later. Next, at step 716, the residence indicator and all words to the right of the residence indicator are captured. If the residence indicator is a word with all letters, it is removed (step 718), but if it has both letters and numbers, the first letter is removed (step 720) and the remainder is kept as part of the address (the reason for this is that a number as part of a residence indicator is often a street number). The captured address is then stored in a searchable data field (such as the illustrated residence location data field in FIG. 5), step 726. Finally, if a secondary person is associated with a line of data, the same address is stored in a searchable data field for that person as well, step 728. A secondary person is an additional person (such as a spouse) listed in a city directory listing along with the primary person (the first person appearing in the listing). An illustration of steps for detecting a secondary person and extracting the name of that person from a line of data will be given later.

FIG. 8 is a simplified flow diagram of an exemplary process for extracting an occupation, such as from one of the lines of data that is seen in FIG. 2. The line of data (from which an occupation is to be extracted) is provided to the system at step 810. In the embodiment illustrated in FIG. 8, the name of the person associated with the line of data is assumed to have been already extracted, and that name within the line of data is identified at step 812. At step 818, any occupational delimiter in the line is identified. An occupational a delimiter is a word, character, or symbol that has been predetermined (e.g., based on experience) as likely to identify the end or boundary of a person's occupation (in this case, likely to identify the end of an occupation listed a city directory). Examples of occupational delimiters will be given later. At step 820, all words after the identified name are captured, reading from left to right, until reaching an occupational delimiter. The captured words are stored in a searchable data field (such as the illustrated occupation data field in FIG. 5), step 824. In some instances (not illustrated in FIG. 8) an occupation will not appear in a city directory, and the system will discard the words captured at step 820 when those words have certain attributes (indicating the captured words are not an occupation). Those attributes be described later in conjunction with FIG. 46.

The embodiments of FIGS. 6, 7 and 8 have been simplified for purposes of describing the general features within system 304 for extracting data. As should be appreciated, for ease of description and understanding, some details have been omitted.

A more comprehensive embodiment (providing details omitted from FIGS. 6, 7 and 8) will be described shortly with reference to FIGS. 9-51. In such embodiment, a more extensive set of data fields, into which extracted data may be stored for each person, are as follows:

Surname
Given Name
Prefix (associated with a name)
Suffix (associated with a name)
Gender
Residence Address
Occupation
Marriage (identifying a marriage relationship with another person listed in the directory)
Family (identifying a family relationship with another person listed in the directory)
Residence Event (identifying a change of residence)
Death Event For purposes of the describing this embodiment (where the extraction process is used in conjunction with lines of data from a city directory), it should be understood that the extraction process generally involves three sub-processes. Those sub-processes are (1) identifying (tagging) certain types of words within the lines of data, (2) identifying certain types of phrases in which those words appear, and then (3) executing rendering rules for analyzing words and phrases in order to extract data that will be useful for populating data fields. It should be pointed out that the identification of certain words and phrases will be done with the reference to and use of pre-established dictionaries, and those dictionaries can be found in Appendices A-L at the end of this description.

Identifying Word Types

The following is a listing of word types or categories that may be found in each line of data (from a city directory), with a brief description of each word category, and reference to a figure in the drawings having specific examples of the word category.

Word

Figure 9:
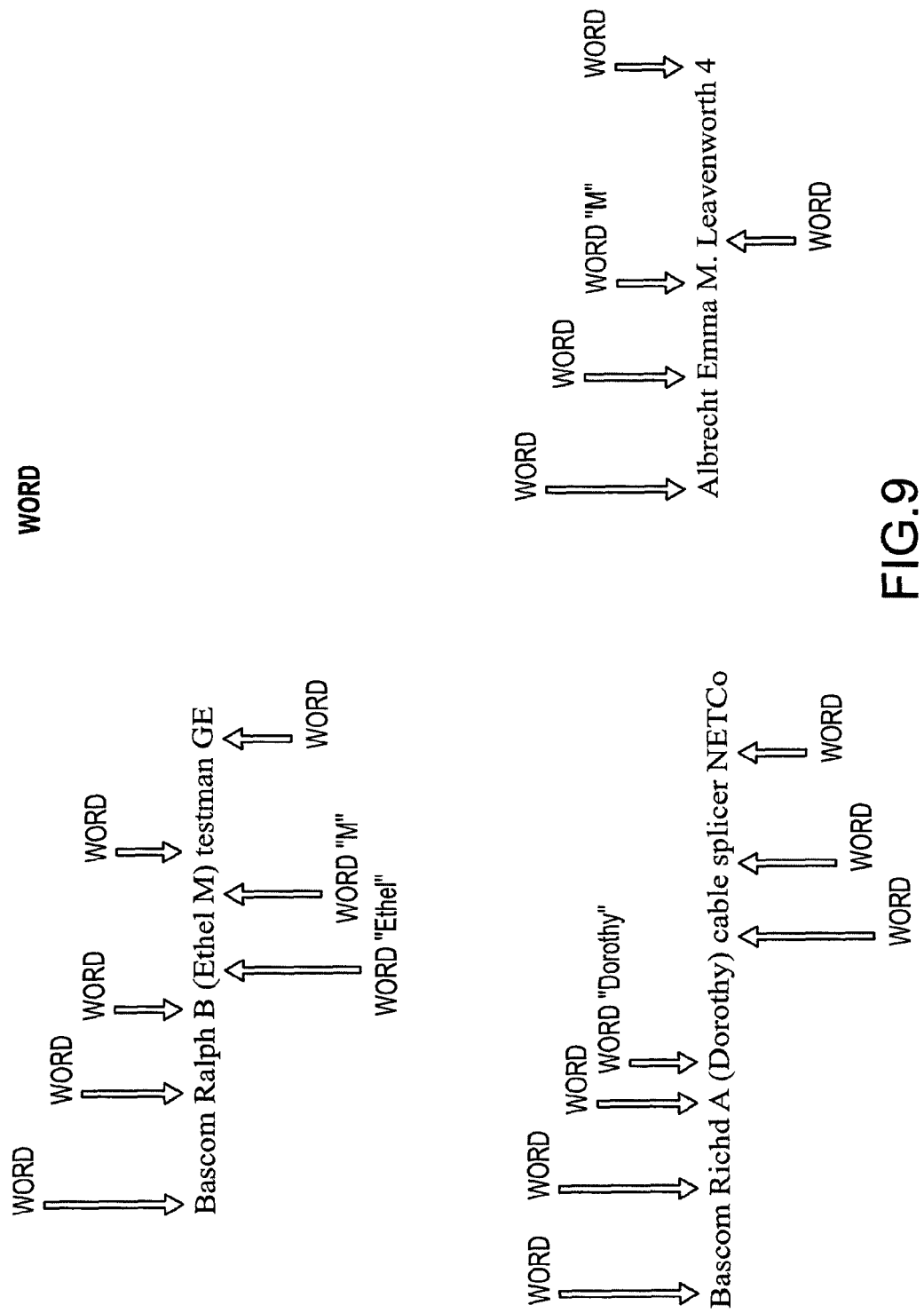

A Word is one or more alphanumeric characters grouped together (separated from other Words by a space). If a punctuation mark appears within a Word, it is ignored and is not part of a Word. FIG. 9 provides several examples of a Word in lines of data originating from a city directory.

Number

A Number is a Word having all numeric characters (0-9). FIG. 10 provides several examples of a Number in lines of data originating from a city directory.

NameWord

Figure 11:
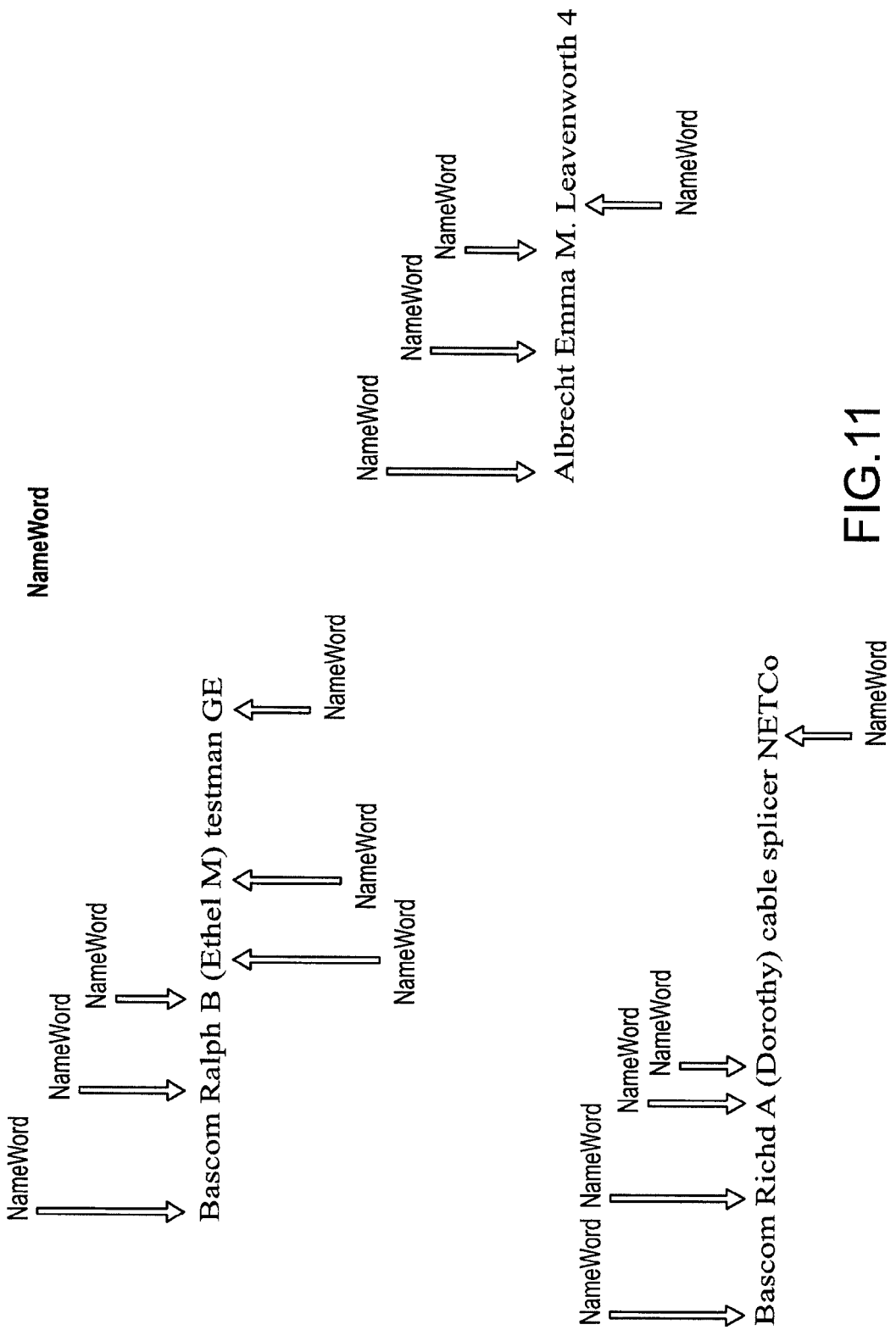

A NameWord is any Word having a proper case (any word where the first letter capitalized, or where all letters capitalized). A NameWord may only contain letter characters or contain characters found in the NameWord Dictionary (Appendix A). FIG. 11 provides several examples of a NameWord in lines of data originating from a city directory.

NumWord

A NumWord is any Word having both letter characters (alpha characters) and numeric characters. FIG. 12 provides several examples of a NumWord in lines of data originating from a city directory.

Month

A Month is a NameWord that appears in the Month Dictionary (Appendix B), and is either preceded or followed by a Number. FIG. 13 provides several examples of a Month in lines of data originating from a city directory.

Lparenthesis

An Lparenthesis is the character "(". FIG. 14 provides examples of an Lparenthesis in lines of data originating from a city directory Rparenthesis A Rparenthesis is the character ")". FIG. 14 also provides examples of an Rparenthesis in lines of data originating from a city directory.

Suffix

Figure 15:
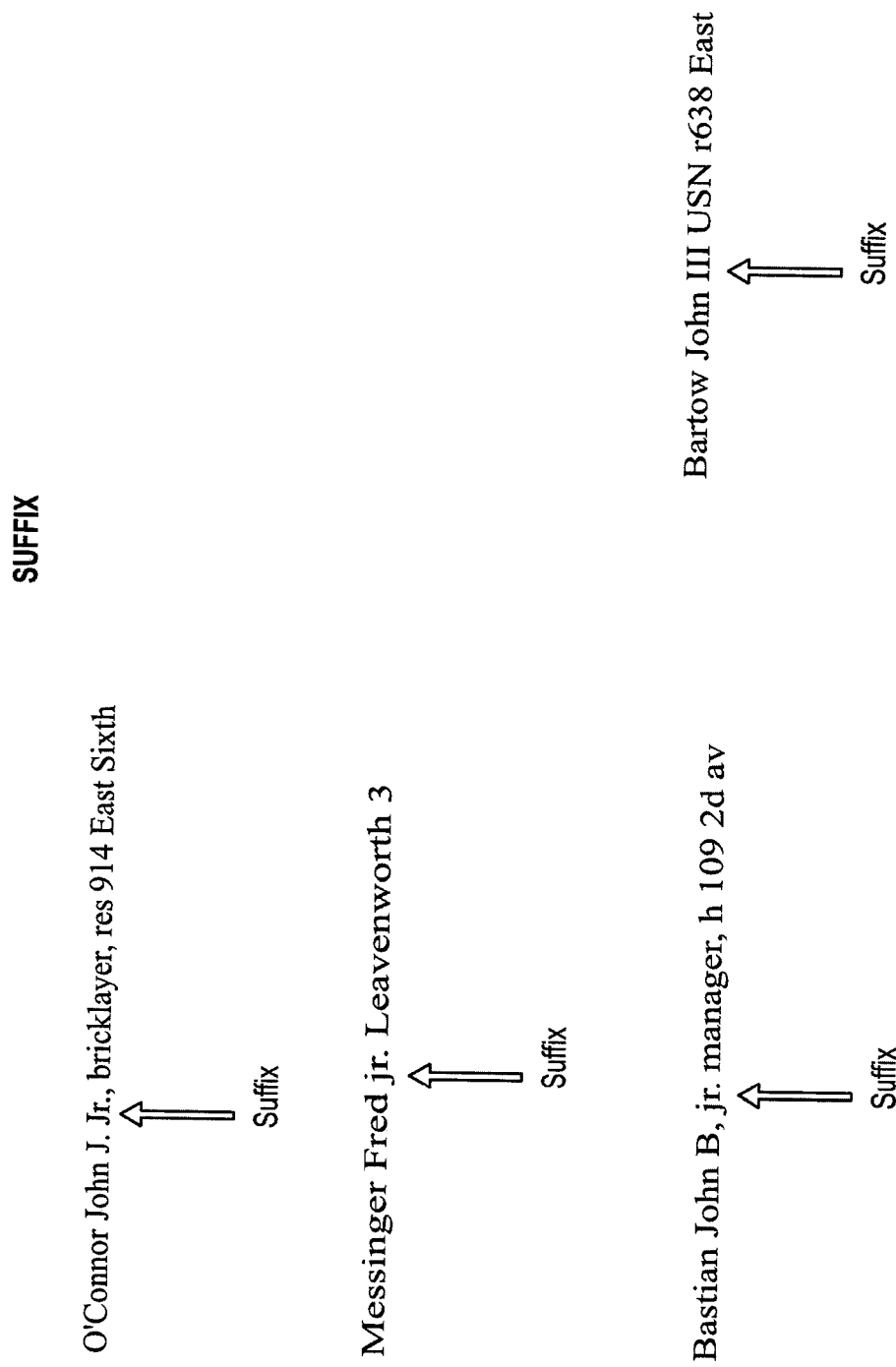

A Suffix is a Word or NameWord that appears in the Suffix Dictionary (Appendix C). FIG. 15 provides several examples of a Suffix in lines of data originating from a city directory.

Prefix

Figure 16:
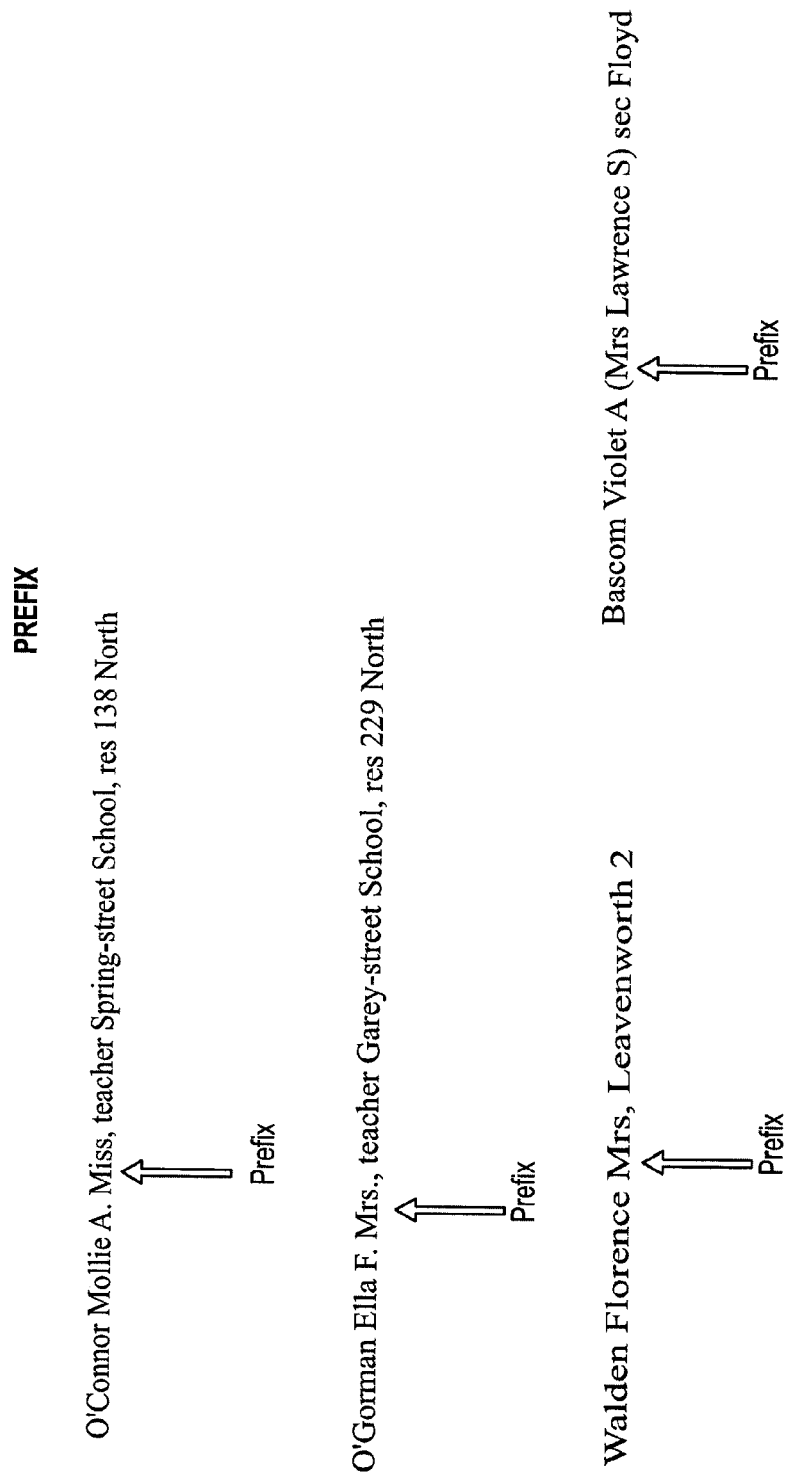

A Prefix is a Word or NameWord that appears in the Prefix Dictionary (Appendix D). FIG. 16 provides several examples of a Prefix in lines of data originating from a city directory.

Date

A Date is one of the following patterns below where N is a Number:

N Month NNNN
NN Month NNNN
N Month NN
NN Month NN
Month N, NNNN
Month NN, NNNN
Month N, NN
Month NN, NN FIG. 17 provides several examples of a Date in lines of data originating from a city directory.

Widow

A Widow is a Word that appears in the Widow Dictionary (Appendix E). FIG. 18 provides several examples of a Widow in lines of data originating from a city directory.

Moccupation

An Moccupation is the first NameWord in the line of data (reading from the left) that can be found in the Moccupation Dictionary (Appendix F, which shows each Moccupation and a corresponding expanded or complete form of the Moccupation). FIG. 19 provides several examples of an Moccupation in lines of data originating from a city directory. As should be appreciated, this word category relates to a military occupation/branch of service.

PNameWord

PNameWord is each of a series of sequential NameWords in the line of data (reading from left) until reaching a delimiter. In the case where the first Word in the line of data is not a NameWord, each Word to the right is read until a NameWord is detected.

A delimiter is defined as either:
any word that is not a NameWord, or
a comma.

In the case where only one PNameWord is detected and the delimiter is a comma, all additional words to the right are read until the next delimiter is reached and all read or captured Words are tagged as a single PNameWord.

Figure 20:
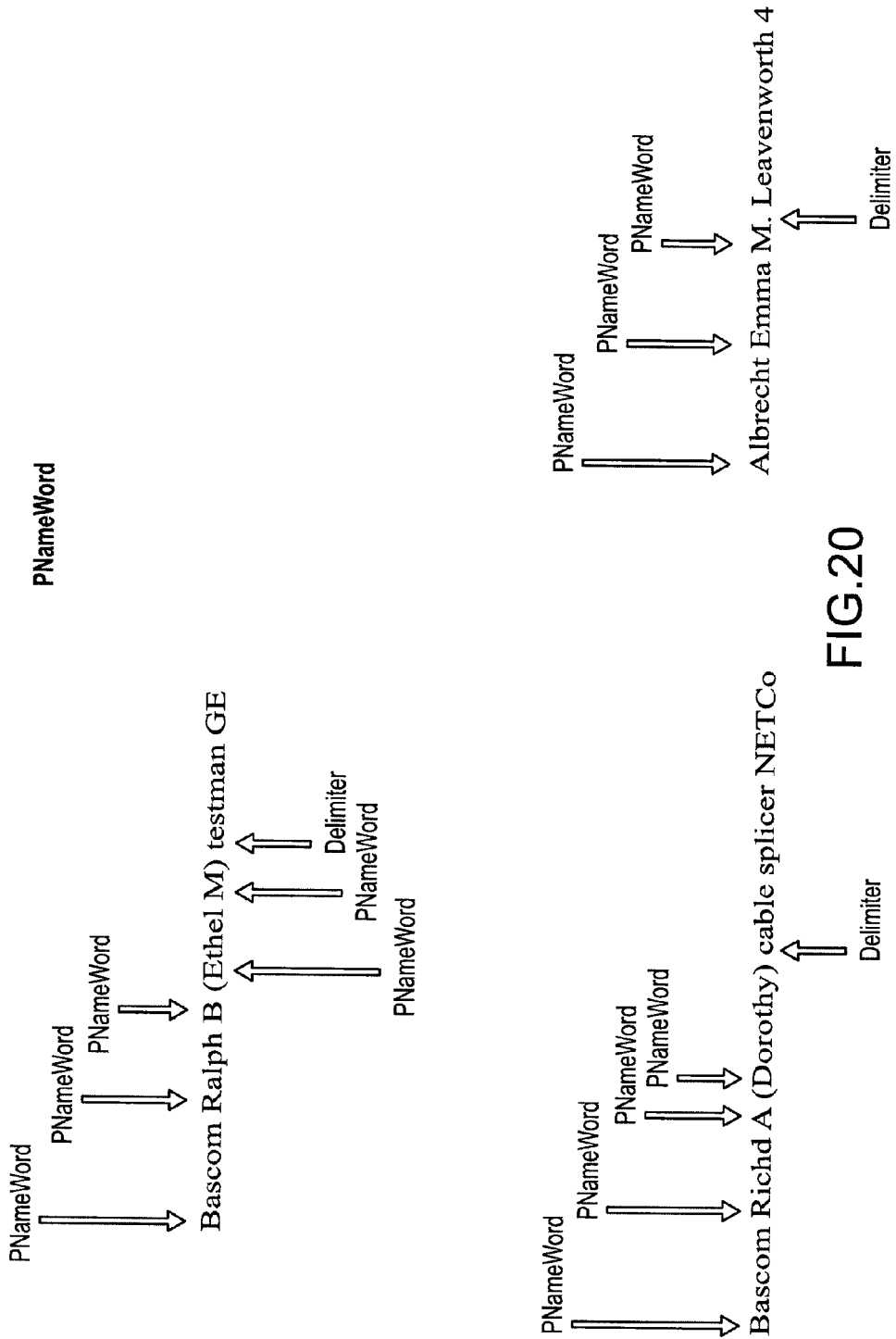

FIG. 20 provides several examples of a PNameWord in lines of data originating from a city directory.

Restype

A Restype is a Word that is either (1) the first Word in the line of data (reading from the left) that can be found in the Restype Dictionary (Appendix G) or (2) the first NumWord in the line of data (reading from the left) that begins with the character "h" or "r", whichever appears first in a line of data (reading from left to right). FIG. 21 provides several examples of a Restype in lines of data originating from a city directory.

Identifying Phrase Types

The following is a listing of phrase types or categories, with a brief description of each phrase category, and reference to a figure in the drawings having specific examples of the phrase category.

MovedPhrase

A MovedPhrase is group of Words relating to a move or change of residence in a line of data. It is identified in a line by first looking for a pattern of Words as follows: one or more PNameWords, followed by a Word appearing the MovedPhrase Dictionary (Appendix H), followed by the Word "to," followed by a NameWord.

If such a pattern is found, then a MovedPhrase is tagged or identified as the Word from the MovedPhrase Dictionary (found in the pattern) and all Words to the right of the Word from the MovedPhrase Dictionary. If there is no such pattern, then there is no MovedPhrase in the line of data. FIG. 22 provides an example of a MovedPhrase in a line of data originating from a city directory.

DiedPhrase

A DiedPhrase is group of Words relating to the death of a person identified in a line of data. It is identified in a line by first looking for a pattern of Words as follows: one or more PNameWords, followed by a Word appearing in the DiedPhrase Dictionary (Appendix I), followed by a Date.

If such a pattern is found, then a DiedPhrase is tagged or identified as the Word from the DiedPhrase Dictionary (found in the pattern) and all Words to the right of the Word from the DiedPhrase Dictionary. If there is no such pattern, then there is no DiedPhrase in the line of data. FIG. 23 provides several examples of a DiedPhrase in lines of data originating from a city directory.

WidowPhrase

A WidowPhrase is group of Words relating to a person having a status of a widow. It is identified in a line by first looking for either one of two patterns of Words as follows:
one or more PNameWords, followed by a Widow (as defined earlier), and then followed by one or more PNameWords, or
one or more PNameWords, followed by a Widow, followed by the word "of," and then followed by one or more PNameWords.

If such a pattern is found, then a WidowPhrase is tagged or identified as the Widow (found in the pattern) and all Words to the right of the Widow. If there is no such pattern, then there is no WidowPhrase in the line of data.

FIG. 24 provides several examples of a WidowPhrase in lines of data originating from a city directory.

SpouseNamePhrase

Figure 25:
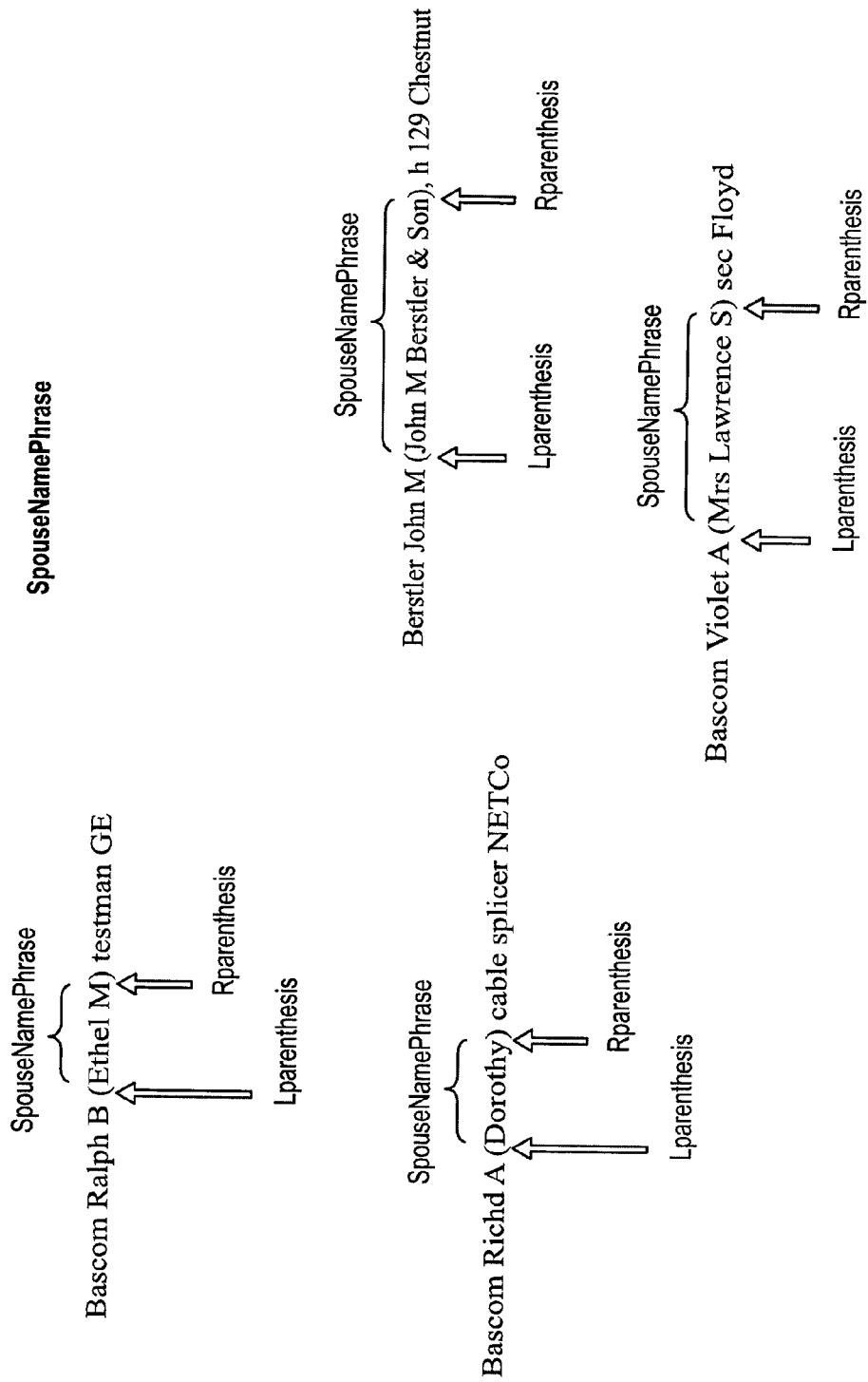

A SpouseNamePhrase is a series of sequential PNameWords in a line of data (reading from left to right), bracketed on the left by a Lparenthesis and on the right by a Rparenthesis. A line can have only one SpouseNamePhrase reading from the left. FIG. 25 provides several examples of a SpouseNamePhrase in lines of data originating from a city directory.

It should be noted that, although in most cases the data in a SpouseNamePhrase (delineated by parentheses as described above) will relate to a spouse of the person listed in the directory, in some cases a SpouseNamePhrase may relate to different information for the person (such as an employer). Logic (to be described shortly) will distinguish between spouse information and other information.

CompanyNamePhrase

Figure 26:
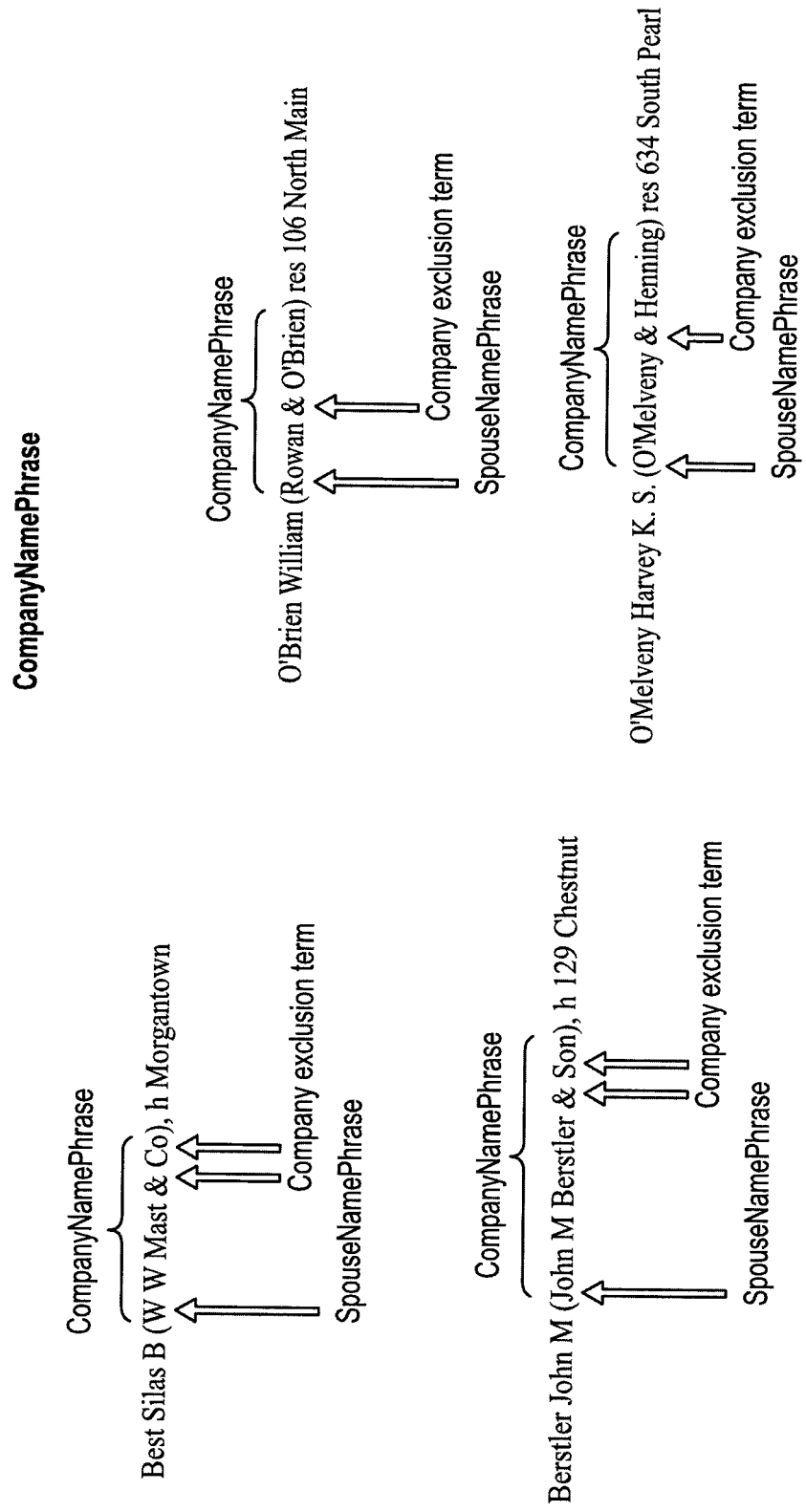

A CompanyNamePhrase is a SpouseNamePhrase containing terms defined in the Company Exclusion Dictionary (Appendix J). FIG. 26 provides several examples of a CompanyNamePhrase in lines of data originating from a city directory.

OccPhrase

An OccPhrase is all sequential Words starting with the first Word after any PNameWords (reading from left to right) and ending with an occupational delimiter as defined below.

An occupational delimiter is defined as:
1. any word that is Number, NameWord, NumWord, Month, Suffix, Prefix, Date, Widow, Moccupation, PNameWord, or Restype2, or
2. any term from the OccPhrase Delimiter Dictionary (Appendix K).

Figure 27:
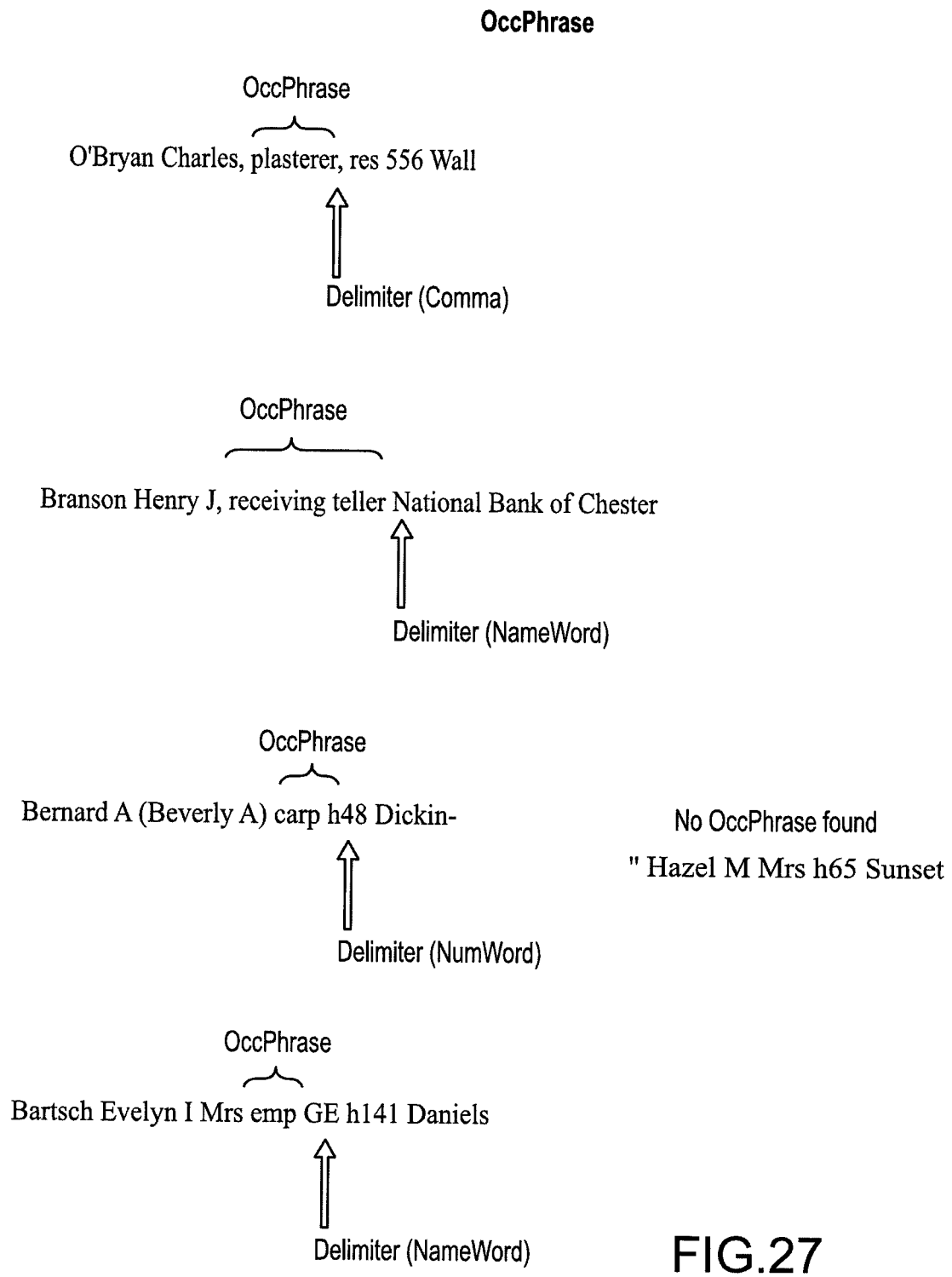

FIG. 27 provides several examples of a OccPhrase in lines of data originating from a city directory.

PNamePhrase

PNamePhrase is a series of sequential PNameWords in a line of data (reading from the left to right), until reaching any Word or phrase that is not a PNameWord.

Figure 28:

In the case where a PNamePhrase contains a comma, preserve the comma for rendering (for later use in extraction of the data). FIG. 28 provides several examples of a PNamePhrase in lines of data originating from a city directory.

AddressPhrase

Figure 29:
Figure 30:
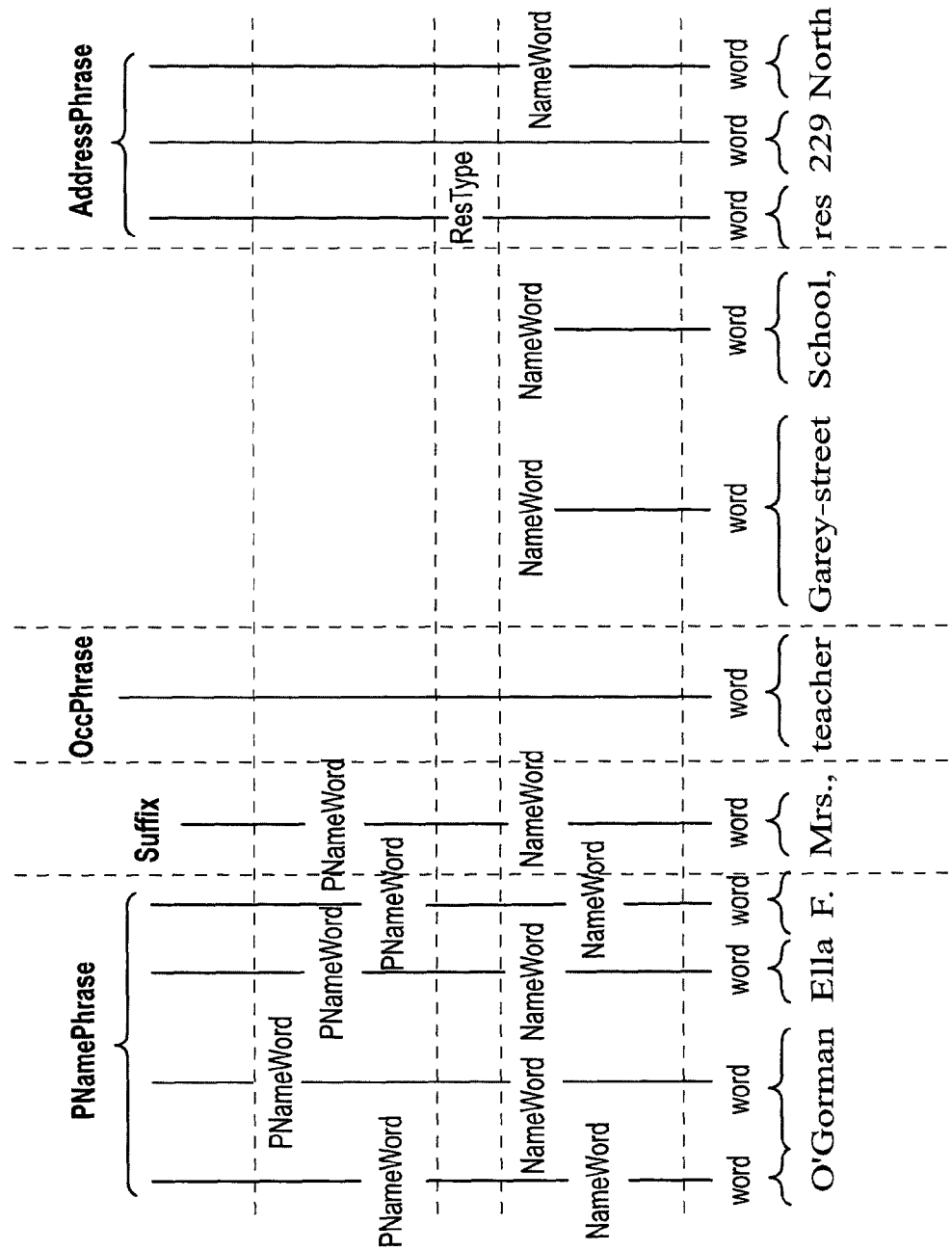
FIGS. 30-38 illustrate lines of data taken from a city directory, with examples of word types and phrase types identified within each line of data.
Figure 31:
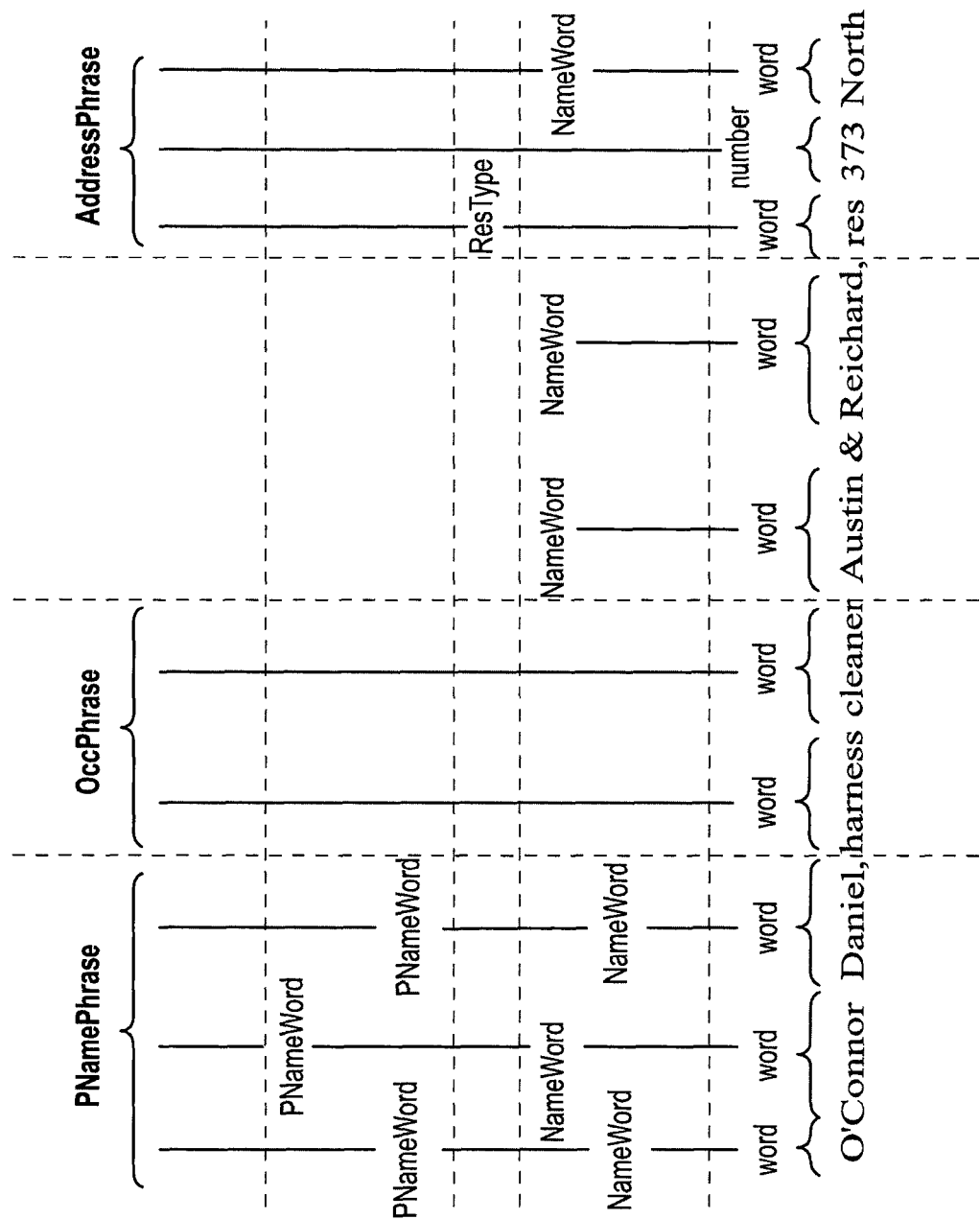
Figure 32:
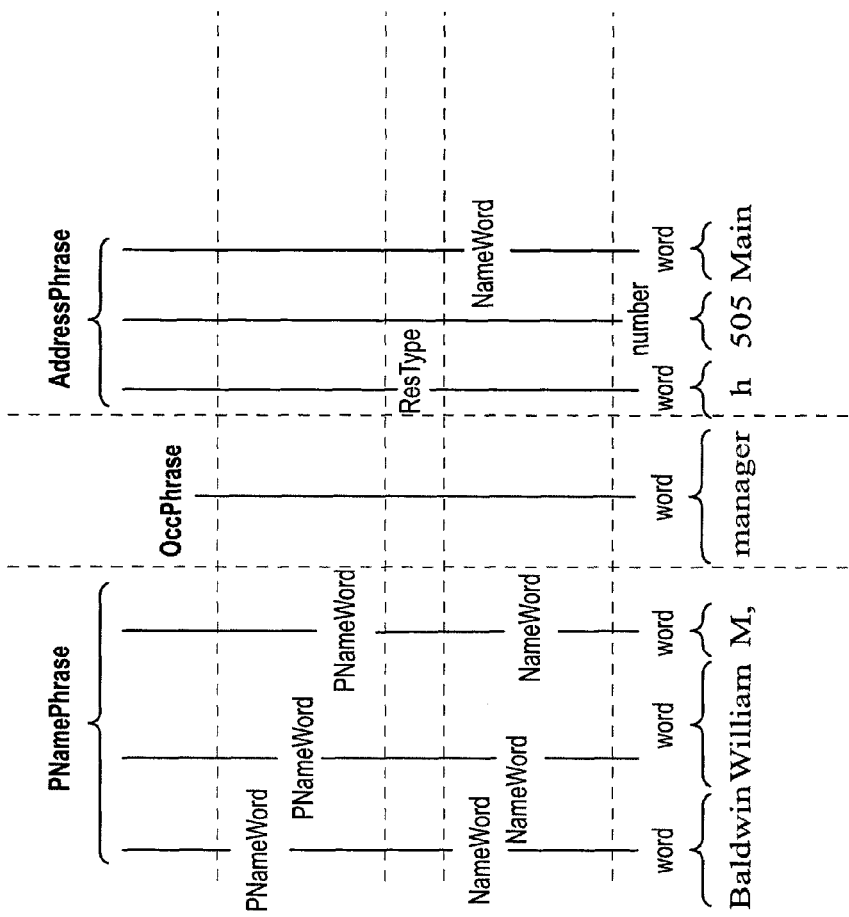
Figure 33:
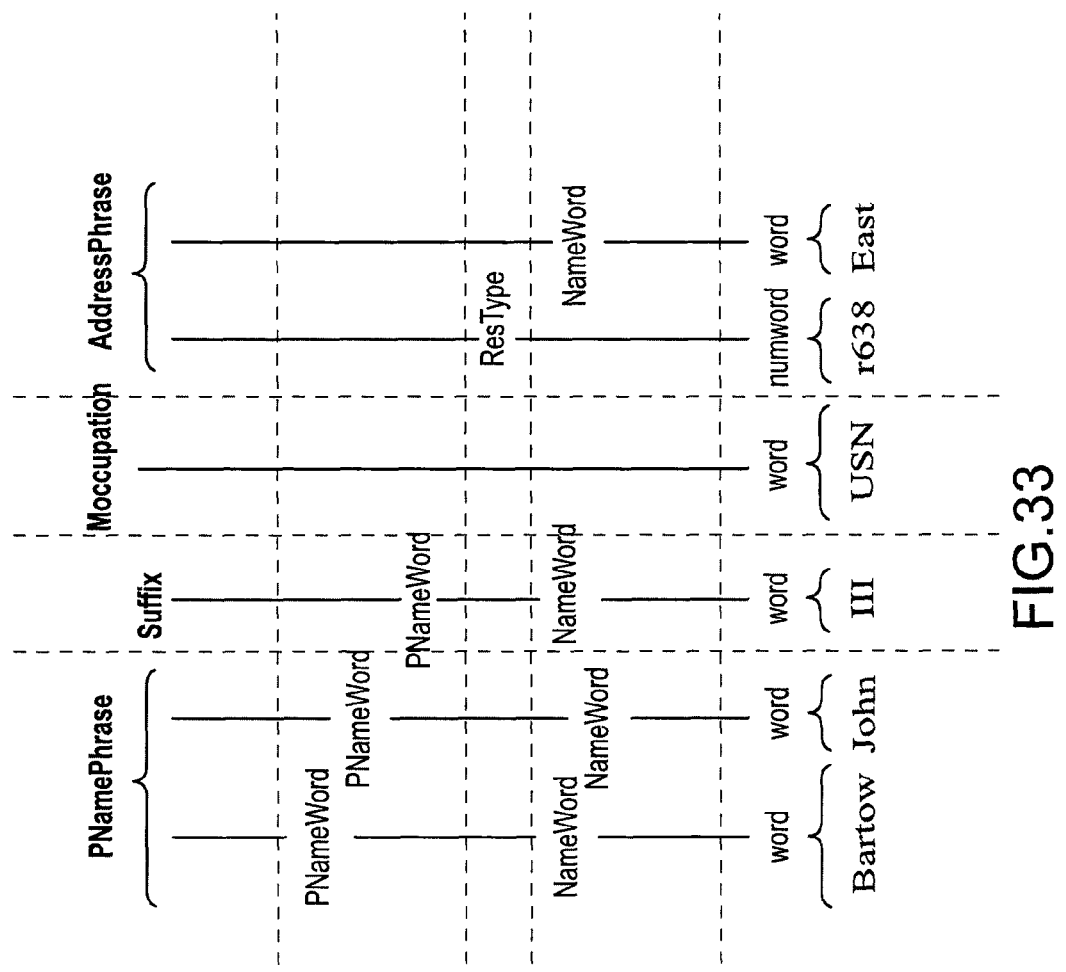
Figure 34:
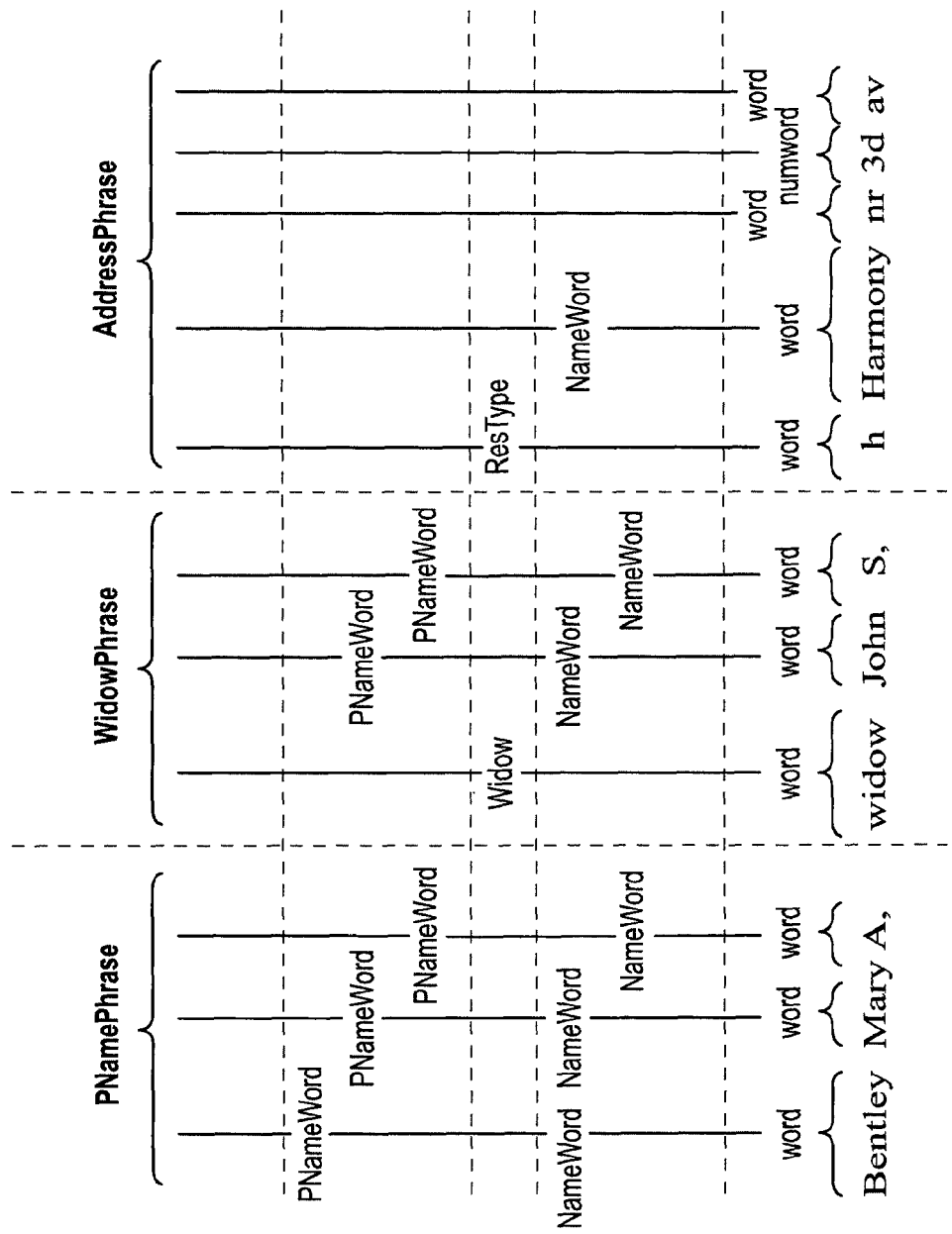
Figure 35:
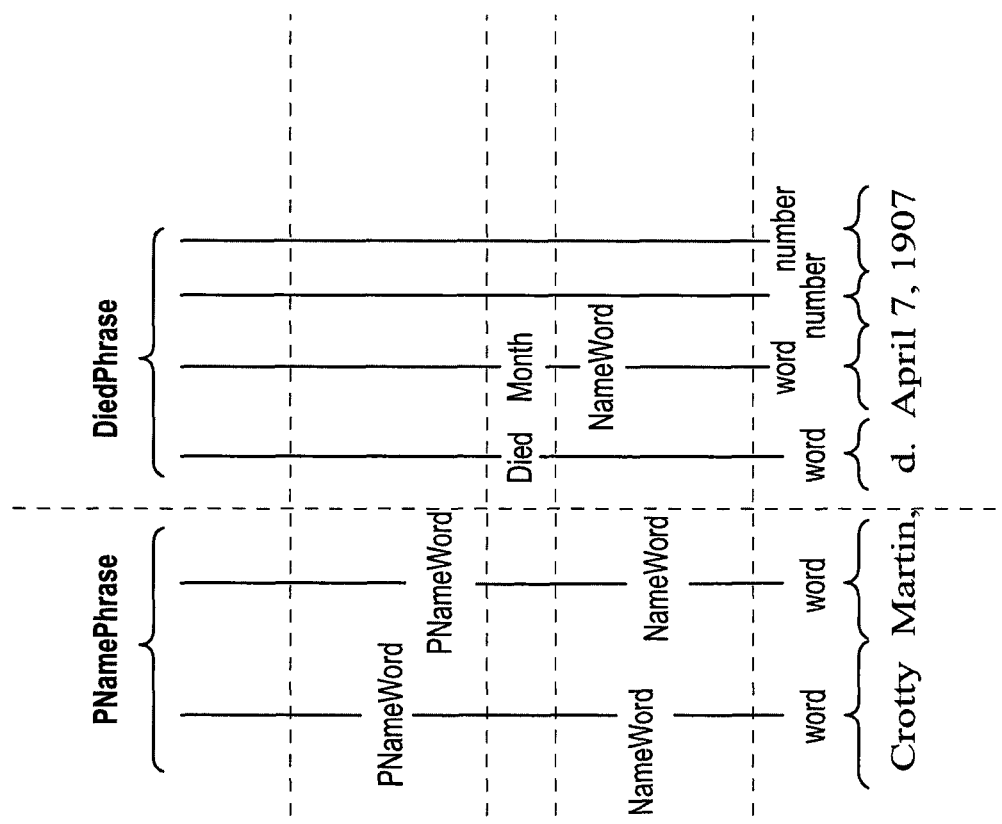
Figure 36:
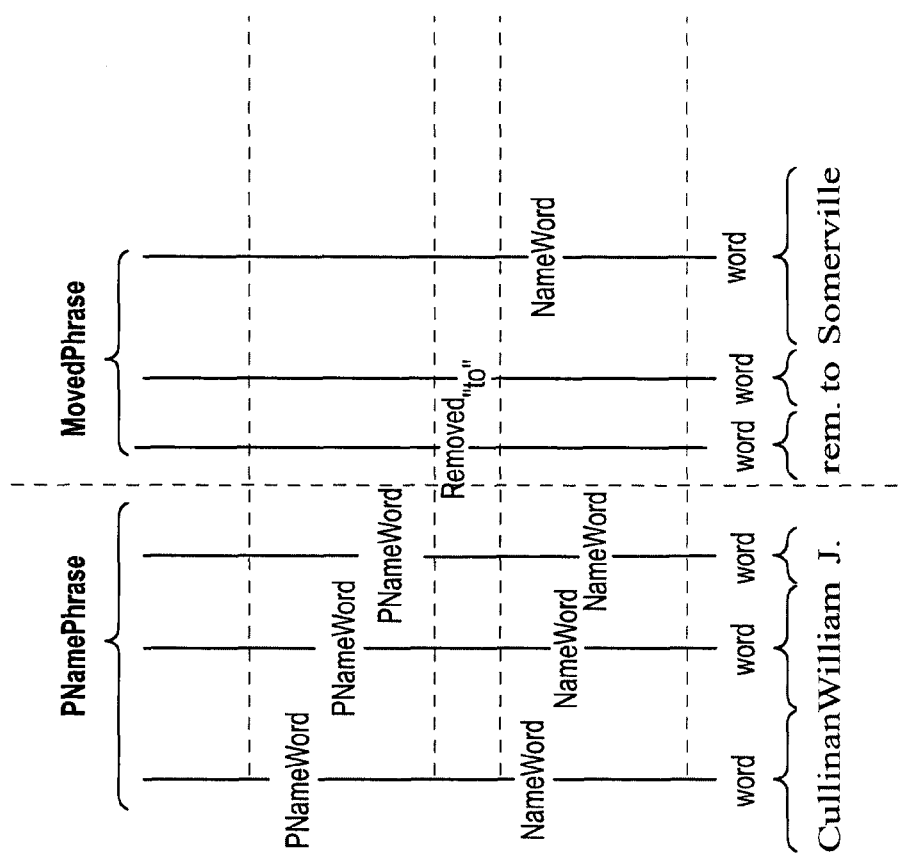
Figure 37:
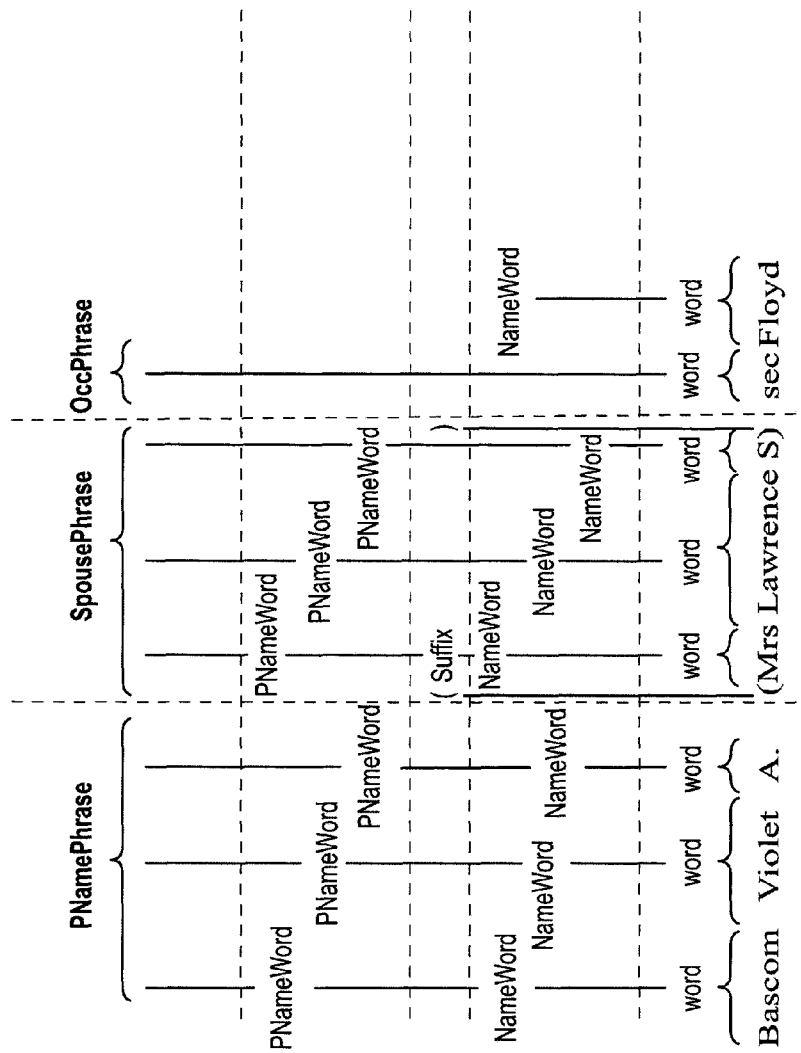
Figure 38:
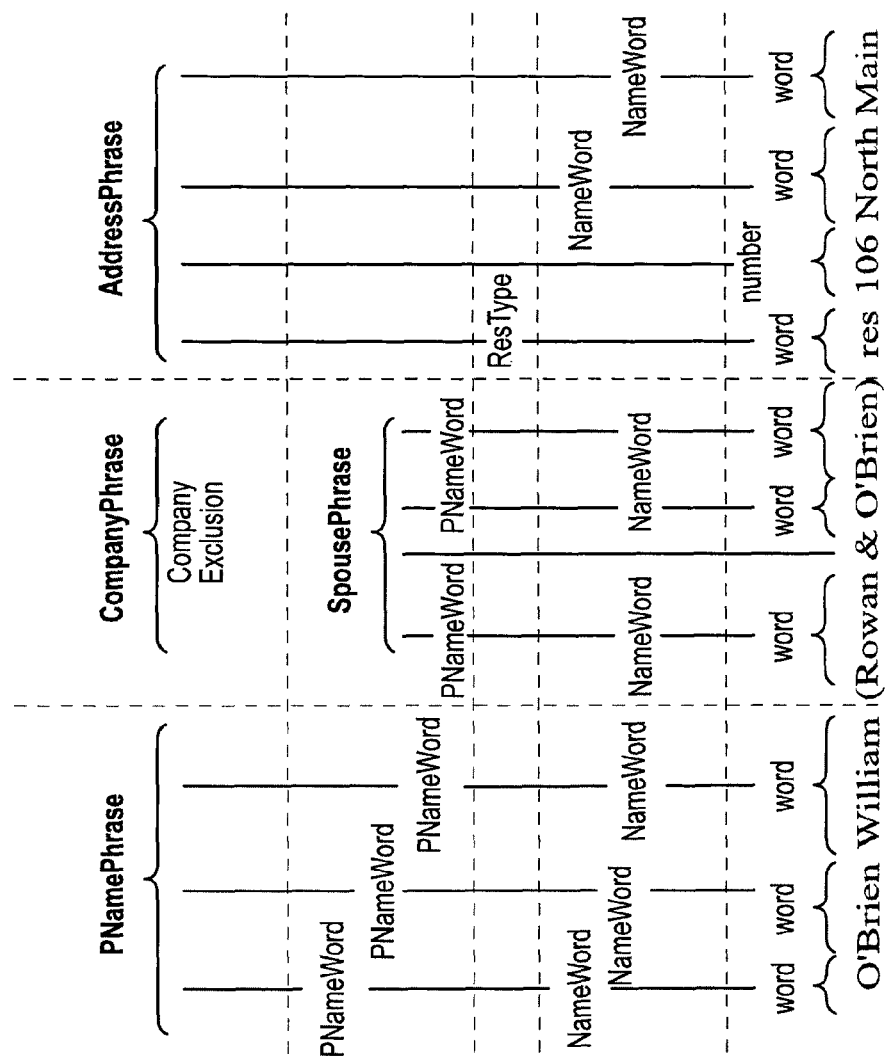

An AddressPhrase is defined as a Restype and all the words to the right of the Restype until the end of the line of data. FIG. 29 provides several examples of an AddressPhrase in lines of data originating from a city directory.

Examples of Word Types and Phrase Types

FIGS. 30-38 each illustrate a line of data, with examples of various types of words and phrases (as described above) that have been identified within each illustrated line of data.

Rendering Rules

The following is a description of rendering rules executed by the document processor 308 within the system 304. Each rule may be used to render (identify and extract/capture) specific data to be stored in a data field, based on identified (tagged) words and phrases. For each rendering rule there is given a description and reference to a figure having specific examples of an application of the rule to lines of data in a city directory.

It should be noted that there is reference in the rendering rules to a primary person and a secondary person. In each line of data (from a city directory) provided to the system, the entry is for the primary person. But as mentioned earlier, in some instances a secondary person (e.g., spouse) may be included in a line of data for the primary person. In such circumstances, and as will be more fully described below, the system will ultimately create two records, one for the primary person and one for the secondary person. Certain data (e.g., an address) will be taken from the data associated with the primary person and attributed to the secondary person (in order to create a separate set of data fields associated with the secondary person).

Surname Rendering

In the case where the PNamePhrase contains a comma, render all NameWords to the left of the comma as the "Surname" of the person.

If there is no comma, render the first word in PNamePhrase as the "Surname" of the person. In the case where the PNamePhrase contains words from a Compound Surname Dictionary (Appendix L), render all words to the left of the rightmost token (or word component) of the words in the Compound Surname Dictionary and one word to the right of the rightmost token as "Surname". As a specific example (and as illustrated in FIG. 39), if the words "de la Hoya" are in the PNamePhrase (and "de" and "la" are words in the Compound Surname Dictionary), the rightmost token is "la," the only word to the left is "de", and the word to the right of the rightmost component is "Hoya," and thus the rendered Surname is "de la Hoya."

If any word in the rendered Surname is found in the Company Exclusion Dictionary (Appendix J), delete the entire entry. This circumstance arises, e.g., when the entry is not for a person but rather a business or company. FIG. 39 provides various examples of a Surname ("s") extracted from various PNamePhrases.

Given Name Rendering

If there is no comma in the PNamePhrase, render all remaining words in PNamePhrase (after rendering/extraction of the Surname) as the "Given Name" on the primary person.

In the case where the PNamePhrase contains a comma, render all NameWords to the right of the comma as the "Given name."

However, if any word in the rendered Given Name is found in the Company Exclusion Dictionary, delete the entire entry.

FIG. 40 provides various examples of a Given Name ("g") extracted from various PNamePhrases.

Prefix Rendering

Where a Prefix word has been indentified (tagged) in a line of data as described earlier, render any tagged Prefix into the data field "Prefix" for the person in the listing.

For Prefix "Miss" or "Mrs," set the "Gender" data field to "Female" on the person. Normalize to "Miss" or "Mrs." (i.e., regardless of variations in form appearing in the line of data, store the prefix in the form of either "Miss" or "Mrs.").

FIG. 41 provides various examples of Prefixes extracted from various PNamePhrases.

Suffix Rendering

Render any tagged Suffix to the "Suffix" data field for the person. As an exception, do not render Suffix tags that appear within a SpouseNamePhrase.

For Suffix of "Jr" or "II" or "III," set the "Gender" data field to "Male".

FIG. 42 provides various examples of Suffixes extracted from various PNamePhrases.

Spouse Name Rendering

Render SpouseNamePhrase as follows:

Create a secondary person (a separate entry and set of data fields) and set the "Given name" for the secondary person to SpouseNamePhrase (i.e., use the SpouseNamePhrase as the given name of the secondary person). Set the Surname data field of the secondary person to match the Surname of the primary person. Set the Gender data field of secondary person to "Female."

On the primary person, set "Gender" to "Male."

For both the primary person and the secondary person, create an element for the Marriage data field with appropriate male and female ids, and create an element for the Family data field with appropriate male and female ids. By way of explanation (and as illustrated in the examples of FIG. 43), each person with a data record stored in memory is given a numerical ID ("person id"). The Marriage field (which is established to reflect marriage data related to the subject of the data record) identifies the primary and secondary persons as married (by showing both of their numerical IDs in the Marriage field, in association with their gender, "m" or "f"). Similarly, the Family field (set up to reflect family data related to the subject of the data record) identifies the primary and secondary persons as being in a family (by showing both of their numerical IDs in the Family field, in association with their gender ("m" or "f").

If a SpouseNamePhrase contains "Mrs" then:

Create a secondary person and set the Given Name to SpouseNamePhrase, but remove words tagged as "Prefixes" inside the SpouseNamePhrase. Set the Surname data field of the secondary person to match the Surname of the primary person. Set the "Gender" of the secondary person to "Male."

On the primary person, set the "Gender" to "Female."

For both the primary person and the secondary person, create an element for the Marriage data field with appropriate male and female ids, and create an element for the Family data field with appropriate male and female ids.

FIG. 43 provides two examples of creating a primary and a secondary person (and their respective data fields) from SpouseNamePhrases. Also shown in FIG. 43 are logical expressions (in the form of XML code) corresponding to each of the examples showing the creation of data elements within the relevant data fields. As an example given in FIG. 43, for the primary person under the listing "Ralph B. Bascom," the numerical ID ("person id") for the primary person is "3:4:1:2." The gender for the primary person is set to male (<gender g="m">) and the primary person is identified as a male married to a secondary female having a numerical ID of "4:4:1:2" (<marriage m="3:4:1:2" f="4:4:1:2"/>).

Residence Address Rendering

Render AddressPhrases as follows:

If Restype is a Word, remove Restype from the AddressPhrase and set the "Residence Address" field to the remaining words in the AddressPhrase.

If Restype is a NumWord, remove first alpha character of the Restype from AddressPhrase and set the "Residence Address" field to the remaining words in the AddressPhrase.

If secondary person exists, set the "Residence Address" for the secondary person to be the same as the primary person.

FIG. 44 provides various examples of extracting residence addresses from various AddressPhrases.

Spouse Address Rendering

Where a SpouseNamePhrase is in the line of data, render the street address of the primary person (usually the husband) to the secondary person (usually the wife).

However, when the spouse is deceased (a Widow tag is in the line of data) do not render a street address to a secondary person.

FIG. 45 provides an example of a spouse address extracted from an AddressPhrase and included in the data record for both the primary person and for the spouse (the spouse is a secondary person).

OccPhrase Rendering

Render all Occphrase tags to the Occupation data field.

For cases where the Word "jr" appears in the OccPhrase:

If the Word "jr" appears as the only Word in the OccPhrase, tag it as a Suffix and do not render any OccPhrase at all (the Occupation data field is left empty).

If the pattern "jr" plus a comma (",") plus a Word(s) is encountered in the OccPhrase, tag the "jr" as a Suffix and render the remaining Word(s) according to the Occphrase rendering rules.

If the Word "jr" appears in the OccPhrase and is followed by one or more Words, render the OccPhrase to the Occupation data field). By way of explanation, this last condition exists when the Prefix is part of a person's occupation (e.g., a junior clerk may be listed as a "jr. clerk").

FIG. 46 provides various examples of occupations extracted from various OccPhrases.

Moccupation Rendering

Render all Moccupation tags to the "Occupation" data field. Expand abbreviations using the corresponding expanded terms found in the Moccupation Dictionary (Appendix F).

FIG. 47 provides various examples of extracted Moccupations (including expanded abbreviations).

MovedPhrase Rendering

Render a MovedPhrase as follows:

Add data (date and location) to the residence event data field, where the date ("nd" in FIG. 48) is the date of the publication and the place ("p") is taken from the first NameWord in the MovedPhrase following the Word "to."

FIG. 48 provides an example of residence event data extracted from a line of data, including a date and location.

DiedPhrase Rendering

Render a DiedPhrase by extracting a normalized death date (for the Death Event field) based on the following:

Set the month to Month found in DiedPhrase,

Set year to four digit Number found in the DiedPhrase, and

Set the day to the remaining Numbers found in DiedPhrase.

FIG. 49 provides examples a Death Event record being created and the storing of a normalized death date in the Death Event data field.

WidowPhrase Rendering

Render WidowPhrase by:

creating a secondary person (for husband of widow) and set "Given name" of the secondary person to WidowPhrase, removing the Widow word from the WidowPhrase, setting "Surname" of the secondary person to match "Surname" on the primary person, setting "Gender" to "Male,"

setting "Gender" to "Female" on primary person data record, creating a marriage element (storing appropriate male and female ids in the Marriage data field) for both the primary and secondary persons, and creating a family element (storing appropriate male and female ids in the Family data field) for both the primary and secondary persons.

FIG. 50 provides an example of a WidowPhrase in a line of data, and logical expressions (in the form of XML code) defining the data records created from rendering the WidowPhrase.

Widow Rendering

Render any remaining Widow tags or words (not rendered as a WidowPhrase), by setting the "Gender" for the person to "Female." In this circumstance, there are no data records created for a secondary person, and no records created for the Marriage or Family data fields.

FIG. 51 provides an example of a line of data having a Widow tag but no WidowPhrase, and logical expressions corresponding the data records created from rendering the Widow tag.

Figure 52:
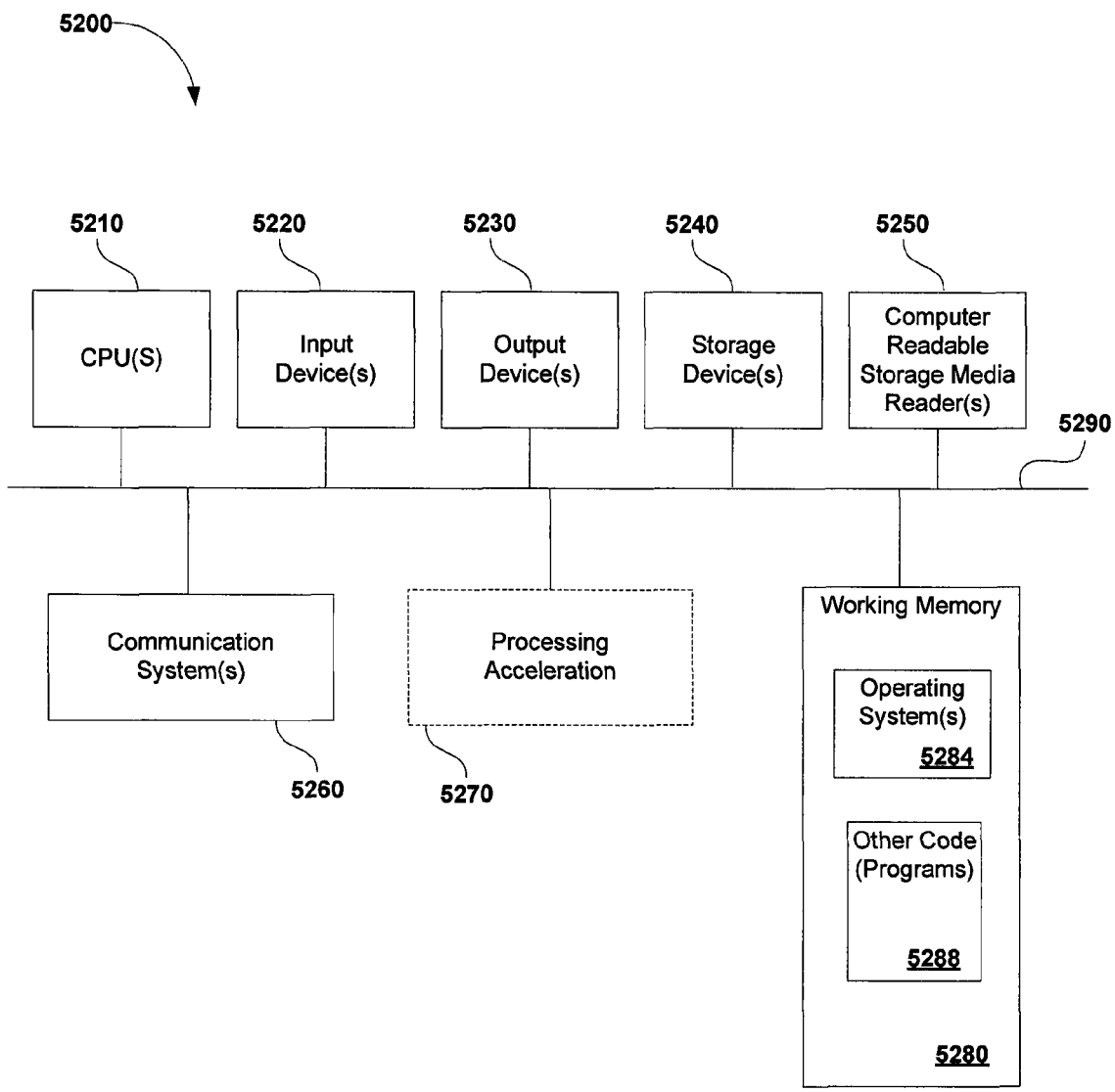
FIG. 52 is a block diagram of a computer system upon which various devices, systems, and processes described herein may be implemented.

Turning now to FIG. 52, there is illustrated a block diagram of an exemplary computer system upon which embodiments of the present invention may be implemented. This example illustrates a computer system 5200 such as may be used, in whole, in part, or with various modifications, to provide the functions of the document processing system 304 (including the document processor 308 and memory system 310), as well as other components and functions of the invention described herein.

The computer system 5200 is shown comprising hardware elements that may be electrically coupled via a bus 5290. The hardware elements may include one or more central processing units 5210, one or more input devices 5220 (e.g., a mouse, a keyboard, etc.), and one or more output devices 5230 (e.g., a display device, a printer, etc.). The computer system 5200 may also include one or more storage devices 5240, representing remote, local, fixed, and/or removable storage devices and storage media for temporarily and/or more permanently containing computer-readable information, and one or more storage media reader(s) 5250 for accessing the storage device(s) 5240. By way of example, storage device(s) 5240 may be disk drives, optical storage devices, solid-state storage device such as a random access memory ("RAM") and/or a read-only memory ("ROM"), which can be programmable, flash-updateable or the like.

The computer system 5200 may additionally include a communications system 5260 (e.g., a modem, a network card—wireless or wired, an infra-red communication device, a Bluetooth™ device, a near field communications (NFC) device, a cellular communication device, etc.) The communications system 5260 may permit data to be exchanged with a network, system, computer, mobile device and/or other component as described earlier. The system 5200 also includes working memory 5280, which may include RAM and ROM devices as described above. In some embodiments, the computer system 5200 may also include a processing acceleration unit 5270, which can include a digital signal processor, a special-purpose processor and/or the like.

The computer system 5200 may also comprise software elements, shown as being located within a working memory 5280, including an operating system 5284 and/or other code 5288. Software code 5288 may be used for implementing functions of various elements of the architecture as described herein. For example, software stored on and/or executed by a computer system, such as system 5200, can be used in implementing the processes seen in FIGS. 4 and 6-8.

It should be appreciated that alternative embodiments of a computer system 5200 may have numerous variations from that described above. For example, customized hardware might also be used and/or particular elements might be implemented in hardware, software (including portable software, such as applets), or both. Furthermore, there may be connection to other computing devices such as network input/output and data acquisition devices (not shown).

While various methods and processes described herein may be described with respect to particular structural and/or functional components for ease of description, methods of the invention are not limited to any particular structural and/or functional architecture but instead can be implemented on any suitable hardware, firmware, and/or software configuration. Similarly, while various functionalities are ascribed to certain individual system components, unless the context dictates otherwise, this functionality can be distributed or combined among various other system components in accordance with different embodiments of the invention. As one example, the document processing system 304 may be implemented by a single system having one or more storage device and processing elements. As another example, the document processing system 304 may be implemented by plural systems, with its respective functions distributed across different systems either in one location or across a plurality of linked locations.

Moreover, while the various flows and processes described herein (e.g., those illustrated in FIGS. 4 and 6-8) are described in a particular order for ease of description, unless the context dictates otherwise, various procedures may be reordered, added, and/or omitted in accordance with various embodiments of the invention. Moreover, the procedures described with respect to one method or process may be incorporated within other described methods or processes; likewise, system components described according to a particular structural architecture and/or with respect to one system may be organized in alternative structural architectures and/or incorporated within other described systems. Hence, while various embodiments may be described with (or without) certain features for ease of description and to illustrate exemplary features, the various components and/or features described herein with respect to a particular embodiment can be substituted, added, and/or subtracted to provide other embodiments, unless the context dictates otherwise. Further, the term "exemplary" used herein does not mean that the described example is preferred or better than other examples. Also, it should be noted that at various places herein there are references to directionality or orientation (such as reading data from left to right). Such references are generally in the context of the arrangement of the figures and features illustrated therein (such as lines of data), and other directions and orientations are within the scope of the invention.

Consequently, although the invention has been described with respect to exemplary embodiments, it will be appreciated that the invention is intended to cover all modifications and equivalents within the scope of the following claims.

APPENDICES A-L

Appendix A

NameWord Dictionary

'
'
-
—
,
:
^
*
é
á
ó
ñ

Appendix B

Month Dictionary

Jan
Jan.
January
Feb
Feb.
February
Mar
Mar.
March
Apr
Apr.
April
May
Jun
Jun.
June
Jul
Jul.
July
Aug
Aug.
August
Sept
Sept.

Month Dictionary

September
Oct
Oct.
October
Nov
Nov.
November
Dec
Dec.
December

Appendix C

Suffix Dictionary

Jr
jr jr.
Jr.
Sr
sr
sr.
Sr.
II
III
IV

Appendix D

Prefix Dictionary

Miss
Mrs
Mrs.
mrs
mrs.
miss

Appendix E

Widow Dictionary widow
widow
w.

Widow Dictionary

Wid
Wid.
wid
wid.
widow of
wid. of
wid of
widow of
wid of
wid. Of

Appendix F

MOccupation Dictionary

USA—US Army
USN—US Navy
USCG—US Coast Guard
USAF—US Air Force
WAC—Women's Army Corps
WAF—Women's Air Force
WAVE—Women's Reserve, US Naval Reserve
WAVES—Women's Auxiliary Volunteer Emergency Services
USMC—US Marine Corps
USMS—US Maritime Services
USNR—US Navy Reserve

Appendix G

Restype Dictionary res
res.
res,
r
r.
r,
rms
rms.
rms,
h
h.
h,
house
boards
b
b.

Restype Dictionary b,
bds
bds.
bds,

Appendix H

MovedPhrase Dictionary moved
removed
rem
rem.

Appendix I

DiedPhrase Dictionary died
deceased
d.

Appendix J

Company Exclusion Dictionary

&
Agencv
Agencv.
Agencv,
Agency
Agency.
Agency,
AGENCY
AGENCY.
AGENCY,
Assn
Assn.
Assn,
ASSN
ASSN.
ASSN,
Assoc
Assoc.
Assoc,
ASSOC

Company Exclusion Dictionary

ASSOC.
ASSOC,
Association

Association.
Association,
ASSOCIATION
ASSOCIATION.
ASSOCIATION,
Auto
Auto.
Auto,
AUTO
AUTO.
AUTO,
Avenue
Avenue.
Avenue,
Ave
Ave.
Ave,
AVENUE
AVENUE.
AVENUE,
AVE
AVE.
AVE,
Bank
Bank.
Bank,
BANK
BANK.
BANK,
Bro
Bro.
Bro,
BRO
BRO.
BRO,
Bros
Bros.
Bros,
BROS
BROS.
BROS,
Building
Building.

Company Exclusion Dictionary

Building,
BUILDING
BUILDING.
BUILDING,
Bureau
Bureau.
Bureau,
BUREAU
BUREAU.
BUREAU,
Cafe
Cafe.
Cafe,
CAFE
CAFE.
CAFE,
Cemetery
Cemetery.
Cemetery,
CEMETERY
CEMETERY.
CEMETERY,
Chapter
Chapter.
Chapter,
CHAPTER
CHAPTER.
CHAPTER,
Cities
Cities.
Cities,
CITIES
CITIES.
CITIES,
City
City.
City,
CITY
CITY.
CITY,
Club
Club.
Club,
CLUB
CLUB.
CLUB,
Co

Company Exclusion Dictionary

Co.
Co,
CO
CO.
CO,
Company
Company.
Company,
COMPANY
COMPANY.
COMPANY,
Corp
Corp.
Corp,
CORP
CORP.
CORP,
Corporation
Corporation.
Corporation,
CORPORATION
CORPORATION.
CORPORATION,
Directory
Directory.
Directory,
DIRECTORY
DIRECTORY.
DIRECTORY,
Employment
Employment.
Employment,
EMPLOYMENT
EMPLOYMENT.
EMPLOYMENT,
Engine
Engine.
Engine, ENGINE
ENGINE.
ENGINE,
Garage
Garage.
Garage,
GARAGE
GARAGE.
GARAGE, Company Exclusion Dictionary Grocery
Grocery.
Grocery,
GROCERY
GROCERY.
GROCERY,
Inc
Inc.
Inc,
INC
INC.
INC,
Ltd
Ltd.
Ltd,
LTD
LTD.
LTD,
Manufacture
Manufacture.
Manufacture,
MANUFACTURE
MANUFACTURE.
MANUFACTURE,
Manufacturing
Manufacturing.
Manufacturing,
MANUFACTURING
MANUFACTURING.
MANUFACTURING,
Market
Market.
Market,
MARKET
MARKET.
MARKET,
Office
Office.
Office,
OFFICE
OFFICE.
OFFICE,
Restaurant
Restaurant.
Restaurant,
RESTAURANT
RESTAURANT.

Company Exclusion Dictionary

RESTAURANT,
School
School.
School,
SCHOOL
SCHOOL.
SCHOOL,
Service
Service.
Service,
SERVICE
SERVICE.
SERVICE,
Shop
Shop.
Shop,
SHOP
SHOP.
SHOP,
Son
Son.
Son,
SON
SON.
SON,
Sons
Sons.
Sons,
SONS
SONS.
SONS,
State
State.
State,
STATE
STATE.
STATE,
Store
Store.
Store,
Station
Station.
Station,
STATION
STATION.
STATION,
Stationers Company Exclusion Dictionary Stationers.
Stationers,
STATIONERS
STATIONERS.
STATIONERS,
STORE
STORE.
STORE,
Warehouse
Warehouse.
Warehouse,
WAREHOUSE
WAREHOUSE.
WAREHOUSE,
Works
Works.
Works,
WORKS
WORKS.
WORKS,
Wrks
Wrks.

Wrks,
WRKS
WRKS.
WRKS,

Appendix K

OccPhrase Delimiter Dictionary at
with
of
,
.

Appendix L

Compound Surname Dictionary

Di
di
De
de
Da
da

Compound Surname Dictionary

Der
der
Des
des
Du
du
D'
D
d
Van
van
Von
von
La
la
Lo
lo
Las
las
Los
los
Le
le
Bin
bin
Ben
ben
O'
O
o
L'
L
l
Mc
mc

What is claimed is:

1. A method for extracting information from a line of computer readable data and creating a searchable data field in which the extracted information is stored, wherein the line of data includes words representing a name of a person and words representing other information related to the person, the method comprising:
   starting at one end of the line, sequentially capturing each word beginning with a capital letter, until a name delimiter is reached, including:
      identifying words and phrases that appear in the line of data, wherein the words and phrases include:
         Name Words that begin with a capitalized letter;
         a PName Word that is any one of the Name Words in a sequence of Name Words appearing in the line of data, the sequence starting at the one end of the line until a PName Word delimiter is reached, wherein the PName Word delimiter is one of (1) a word that is not a Name Word and (2) a comma; and
         a PName Phrase that is sequence of PName Words appearing in the line of data, starting at the one end of the line until a PName Phrase delimiter is reached, wherein the PName Phrase delimiter is any word that is not a PName Word; and
      capturing the PName Phrase;
   designating the sequentially captured words as the name of the person;
   storing the designated name in a searchable data field; and
   associating the other information from the line of computer readable data with the designated name.

2. The method of claim 1, wherein the name delimiter is selected from a group consisting of:
   a comma;
   a word that does not begin with a capital letter;
   a word that represents the name of a spouse;
   a word having at least one character that is a number;
   a word that represents a date;
   a word that represents a status as a widow;
   a word that represents an occupation;
   a word that represents a suffix; and
   a word that represents a prefix.

3. The method of claim 1, further comprising:
   applying a rendering rule to the captured PName Phrase in order to designate the name of the person and store the designated name in a searchable data field, the applied rendering rule including logic indentifying, for the designated name, both a surname and a given name.

4. The method of claim 3, wherein the other information is address information, and wherein the step of associating the other information with the designated name comprises:
   establishing a plurality of pre-determined address designators; and
   starting at the one end of the line, sequentially capturing each word in the line that follows an address designator in the line;
   designating the captured words following the address designator as the address of the person; and
   storing the designated address in a searchable data filed in association with the designated name.

5. The method of claim 3, wherein the other information is occupation information, and wherein the step of associating the other information comprises:
   establishing a plurality of pre-determined occupational delimiters;
   starting at the one end of the line, sequentially capturing each word in the line that is not a Name Word until reaching an occupational delimiter;
   designating the captured words as the occupation of the person; and
   storing the designated occupation in a searchable data filed in association with the designated name.

6. The method of claim 1, wherein the line of computer readable data is from a city directory.

7. The method of claim 6, wherein printed information in the city directory has been optically scanned and provided to an optical character recognition system, and wherein the lines of the computer readable data have irrelevant information that is removed and lines that are reconstructed, so that there is only one line of computer readable data corresponding to each person listed in the directory before the lines of computer readable data have information extracted.

8. A system for extracting information from a line of computer readable data and creating a searchable data field in which the extracted information is stored, wherein the line of data includes words representing a name of a person and words representing other information related to the person, the system comprising:
- a memory device for storing data is searchable data fields; and
- a processor configured to:
  - starting at one end of the line of data, sequentially capture each word beginning with a capital letter, until a name delimiter is reached, by:
    - identifying words and phrases that appear in the line of data, wherein the words and phrases include:
      - Name Words that begin with a capitalized letter;
      - a PName Word that is any one of the Name Words in a sequence of Name words appearing in the line of data, the sequence starting at the one end of the line until a PName Word delimiter is reached, wherein the PName Word delimiter is one of (1) a word that is not a Name Word and (2) a comma; and
      - a PName Phrase that is sequence of PName Words appearing in the line of data, starting at the one end of the line until a PName Phrase delimiter is reached, wherein the PName Phrase delimiter is any word that is not a PName Word; and
    - capturing the PName Phrase;
  - designate the sequentially captured words as the name of the person;
  - store the designated name in a searchable data field in the memory device; and
  - associate the other information from the line of computer readable data with the designated name.

9. The system of claim 8, wherein the name delimiter is selected from a group consisting of:
- a comma;
- a word that does not begin with a capital letter;
- a word that represents the name of a spouse;
- a word having at least one character that is a number;
- a word that represents a date;
- a word that represents a status as a widow;
- a word that represents an occupation;
- a word that represents a suffix; and
- a word represents a prefix.

10. The system of claim 8, wherein the processor is further configured to:
- apply a rendering rule to the captured PName Phrase in order to designate the name of the person and store the designated name in a searchable data field, the applied rendering rule including logic indentifying, for the designated name, both a surname and a given name.

11. The system of claim 10, wherein the other information is address information, and wherein the processor is configured to associate the other information with the designated name by:
- establishing a plurality of pre-determined address designators; and
- starting at the one end of the line, sequentially capturing each word in the line that follows an address designator in the line;
- designating the captured words following the address designator as the address of the person; and
- storing the designated address in a searchable data filed in association with the designated name.

12. The system of claim 10, wherein the other information is occupation information, and wherein the processor is configured to associate the other information with the designated name by:
- establishing a plurality of pre-determined occupational delimiters;
- starting at the one end of the line, sequentially capturing each word in the line that is not a Name Word until reaching an occupational delimiter;
- designating the captured words as the occupation of the person; and
- storing the designated occupation in a searchable data filed in association with the designated name.

13. The system of claim 8, wherein the line of computer readable data is from a city directory.

14. The system of claim 13, further comprising an optical scanner and an optical character recognition system, wherein printed information in the city directory has been optically scanned by the scanner and provided to the optical character recognition system for converting the printed information into computer readable data, and wherein the processor is further configured to remove lines of the computer readable data that have irrelevant information and to reconstruct lines of the computer readable data so that there is only one line of computer readable data corresponding to each person listed in the directory, and wherein the processor is further configured to receive the reconstructed lines of data for extracting information.

* * * * *

UNITED STATES PATENT AND TRADEMARK OFFICE
CERTIFICATE OF CORRECTION

PATENT NO.        : 8,949,110 B2                                         Page 1 of 1
APPLICATION NO.   : 13/242566
DATED             : February 3, 2015
INVENTOR(S)       : McCombs et al.

It is certified that error appears in the above-identified patent and that said Letters Patent is hereby corrected as shown below:

In the Claims:

Column 24, line 6, Claim 1 delete "including:" and insert --including;--.

Column 24, line 8, Claim 1 delete "phrases" and insert --phrase--.

Column 24, line 8, Claim 1 delete "include:" and insert --include;--.

Column 24, line 42, Claim 3 delete "indentifying" and insert --identifying--.

Column 25, line 32, Claim 8 delete "a" and insert --A--.

Column 26, line 8, Claim 10 delete "indentifying" and insert --identifying--.

Column 26, line 39, Claim 14 delete "an" and insert --a--.

Signed and Sealed this
Seventeenth Day of November, 2015

Michelle K. Lee
*Director of the United States Patent and Trademark Office*